(12) United States Patent
Breazlan

(10) Patent No.: US 12,296,917 B2
(45) Date of Patent: May 13, 2025

(54) TILT CONTROL SYSTEM

(71) Applicant: Jason Breazlan, Arbor Vitae, WI (US)

(72) Inventor: Jason Breazlan, Arbor Vitae, WI (US)

(*) Notice: Subject to any disclaimer, the term of this patent is extended or adjusted under 35 U.S.C. 154(b) by 0 days.

(21) Appl. No.: 18/433,907

(22) Filed: Feb. 6, 2024

(65) Prior Publication Data
US 2024/0400150 A1 Dec. 5, 2024

Related U.S. Application Data

(60) Provisional application No. 63/504,841, filed on May 30, 2023.

(51) Int. Cl.
*B62K 5/10* (2013.01)
*B62H 1/12* (2006.01)
(Continued)

(52) U.S. Cl.
CPC ............... *B62K 5/10* (2013.01); *B62H 1/12* (2013.01); *B62K 5/027* (2013.01); *B62K 5/08* (2013.01); *B62K 27/02* (2013.01); *B62K 27/14* (2013.01)

(58) Field of Classification Search
CPC . B62K 5/10; B62K 5/08; B62K 5/027; B62K 27/00; B62K 27/02; B62K 27/10;
(Continued)

(56) References Cited

U.S. PATENT DOCUMENTS 1,437,115 A * 11/1922 Morton ............... B62K 27/02
280/203
3,941,405 A * 3/1976 Vetter ................ B62K 27/00
280/203
(Continued)

FOREIGN PATENT DOCUMENTS

AT 394985 B 8/1992
DE 3303016 A1 * 8/1984
(Continued)

OTHER PUBLICATIONS

Indian Motorcycle. Smart Lean Technology webpage. Available online at https://www.indianmotorcycle.com/en-us/smart-lean-technology/. Accessed on Jun. 12, 2020.
(Continued)

*Primary Examiner* — Keith J Frisby
(74) *Attorney, Agent, or Firm* — Quarles & Brady LLP

(57) ABSTRACT

A tilt control system for a sidecar and a motorcycle. The tilt control system can include a main frame, a tilting frame, and an actuator. The actuator can be coupled to the main frame and to the tilting frame, and can be configured to control tilting of the tilting frame relative to the main frame. The tilt control system can include a sensor, and a controller in communication with the actuator and the sensor. The controller can be configured to determine an operating parameter (e.g., a pressure) based on sensor data received from the sensor, compare the operating parameter to a threshold criteria, and cause the actuator to control the orientation of the tilting frame relative to the main frame, based on the comparison of the operating parameter to the threshold criteria.

19 Claims, 8 Drawing Sheets

(51) Int. Cl.
  *B62K 5/027* (2013.01)
  *B62K 5/08* (2006.01)
  *B62K 27/02* (2006.01)
  *B62K 27/14* (2006.01)

(58) Field of Classification Search
  CPC .... B62K 27/12; B62K 27/14; B60G 2300/45; B60G 2300/12; B60G 2300/122; B60G 21/007; B62H 1/12
  USPC ...... 180/210; 280/124.103, 5.509, 203, 6.15, 280/293, 763.1, 767, 62, 755
  See application file for complete search history.

(56) References Cited

U.S. PATENT DOCUMENTS

| | | | |
|---|---|---|---|
| 4,022,483 A | 5/1977 | Wallick et al. | |
| 4,203,500 A | 5/1980 | Kamiya | |
| 4,350,359 A * | 9/1982 | Van Gompel | B62K 27/16 280/203 |
| 4,385,770 A | 5/1983 | Mitchell | |
| 4,484,648 A * | 11/1984 | Jephcott | B60G 21/007 280/6.15 |
| 5,765,846 A * | 6/1998 | Braun | B60G 21/026 280/124.103 |
| 6,435,522 B1 * | 8/2002 | Van Den Brink | B62D 9/02 280/5.509 |
| 6,508,483 B1 | 1/2003 | Frank | |
| 7,006,901 B2 | 2/2006 | Wang | |
| 7,396,033 B2 | 7/2008 | Murata | |
| 7,487,985 B1 | 2/2009 | Mighell | |
| 7,600,596 B2 * | 10/2009 | Van Den Brink | B62K 5/10 180/41 |
| 7,857,324 B2 * | 12/2010 | Yun | B62K 27/00 280/203 |
| 7,967,306 B2 | 6/2011 | Mighell | |
| 8,235,419 B1 | 8/2012 | Giarusso | |
| 8,925,940 B2 | 1/2015 | Mighell | |
| 2004/0026889 A1 * | 2/2004 | Foley | B62K 27/00 280/203 |
| 2007/0262549 A1 * | 11/2007 | Haerr | B60G 21/007 280/274 |
| 2009/0312908 A1 * | 12/2009 | Van Den Brink | B62D 9/02 280/5.509 |
| 2010/0007109 A1 | 1/2010 | Mighell | |
| 2011/0148052 A1 * | 6/2011 | Quemere | B60G 21/073 280/6.15 |
| 2011/0248463 A1 | 10/2011 | Mighell | |
| 2013/0161919 A1 * | 6/2013 | Gaillard-Groleas | B60G 99/00 280/124.103 |
| 2013/0207363 A1 | 8/2013 | Mighell | |
| 2015/0203154 A1 | 7/2015 | Mighell | |
| 2018/0222545 A1 * | 8/2018 | Wei | B62K 25/04 |
| 2020/0384824 A1 * | 12/2020 | Breazlan | B60G 21/06 |

FOREIGN PATENT DOCUMENTS

| | | | | |
|---|---|---|---|---|
| DE | 3711554 A1 * | 10/1988 | | |
| DE | 102017213203 | 1/2019 | | |
| FR | 2646379 A1 * | 4/1989 | | |
| FR | 2668112 A1 * | 4/1992 | | B62K 27/00 |
| WO | WO-9534459 A1 * | 12/1995 | | B60G 17/0162 |
| WO | WO-2007087255 A2 * | 8/2007 | | B62H 1/12 |

OTHER PUBLICATIONS

JP Cycles. Tilting Motor Works—Leaning 3-Wheeled Harleys and Wings. Article accessed online at https://www.jpcycles.com/countersteer/buyers-guide/tilting-motor-works-leaning-3-wheeled-harleys-and-wings. Posted Jan. 6, 2016.
LandinGear LegUp webpage. Accessed online at https://landingear.com/. Version from Jan. 2019.
Lit Motors. Website. Accessed online at: https://www.litmotors.com/. Version dated May 14, 2019.
Thompson. Warner Linear H-Track Actuators brochure. 2019.
Tilting Motor Works. Homepage. Website.https://www.tiltingmotorworks.com/ Version accessed May 17, 2019.
Harley Davidson. Reflex Defensive Rider Systems. Accessed online at https://www.harley-davidson.com/us/en/content/reflex-defensive-rider-systems.html on Jun. 12, 2020.

* cited by examiner

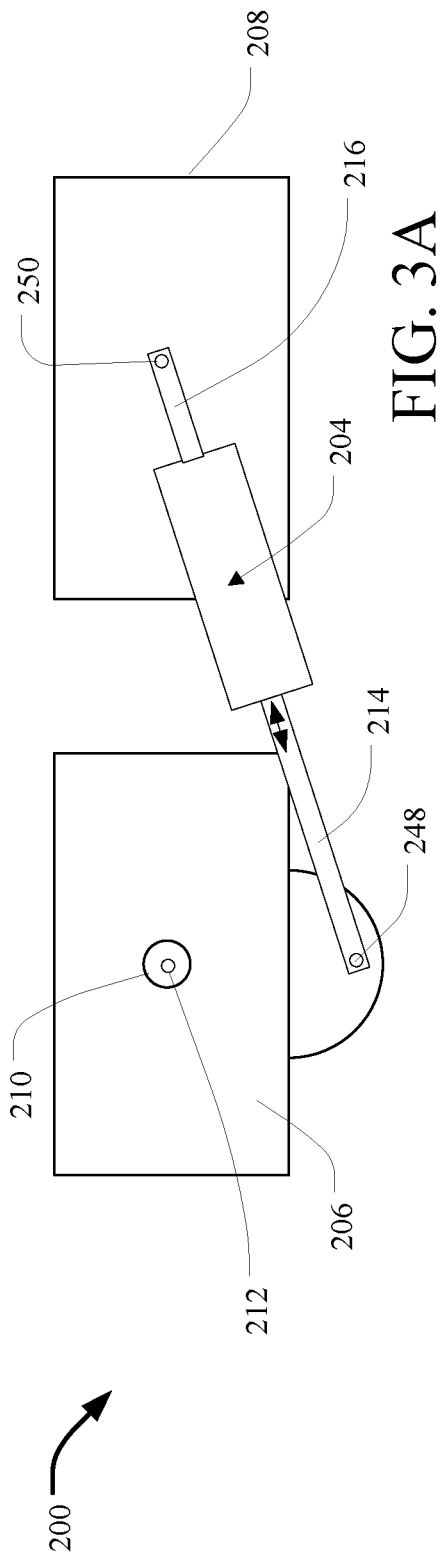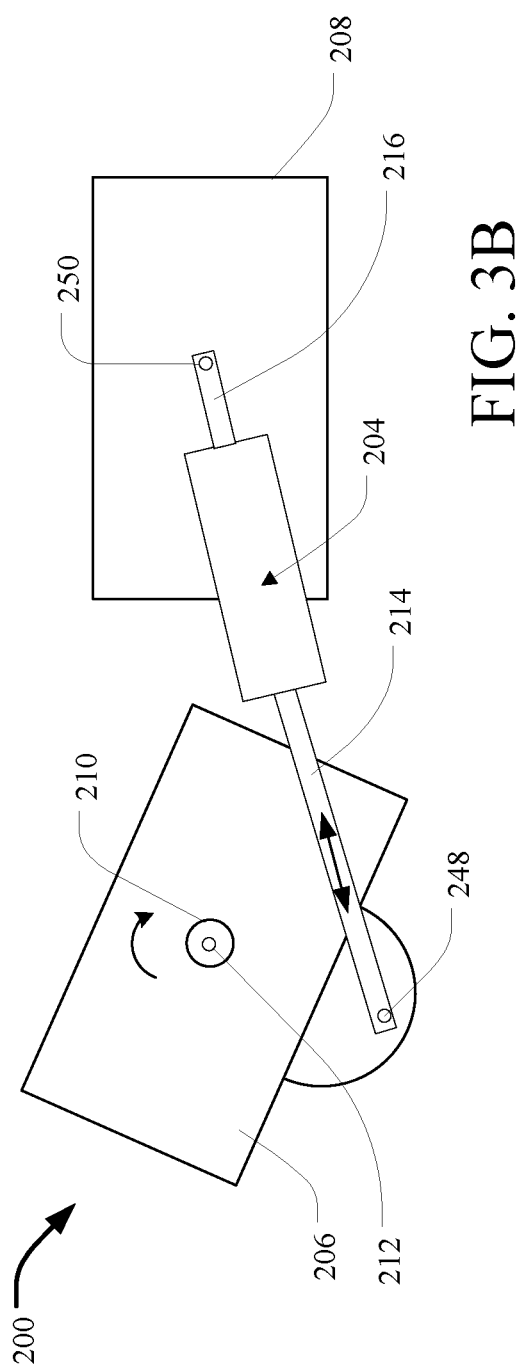

TILT CONTROL SYSTEM

CROSS-REFERENCE TO RELATED APPLICATIONS

The present application is based on and claims priority to U.S. Provisional Patent Application No. 63/504,841, filed May 30, 2023, and entitled "Tilt Control System," which is hereby incorporated by reference herein in its entirety.

BACKGROUND

Sidecars enable typical motorcycles to be converted into three-wheeled vehicles, such that they can accommodate an additional passenger, or belongings, to travel alongside the motorcycle. In a typical configuration, sidecars have a frame that connects to a lateral side of the motorcycle frame, which allows for a fixed connection between the sidecar and the motorcycle. Other vehicle systems can also be similarly configured, including motorcycle-type vehicles with three wheels (i.e., trikes).

SUMMARY

Some embodiments of the disclosure provide a tilt control system for a sidecar and a motorcycle. The tilt control system can include a main frame, a tilting frame, and an actuator. The actuator can be coupled to the main frame and to the tilting frame. The actuator can be configured to control tilting of the tilting frame relative to the main frame. The tilt control system can include a sensor, and a controller in communication with the actuator and the sensor. The controller can be configured to determine an operating parameter based on sensor data received from the sensor, compare the operating parameter to a threshold criteria, and cause the actuator to control the orientation of the tilting frame relative to the main frame, based on the comparison of the operating parameter to the threshold criteria.

In some embodiments, the controller can be configured to cause the actuator to control the orientation of the tilting frame by at least one of causing the actuator to lock the current orientation of the tilting frame relative to the main frame, or causing the actuator to retract or extend, thereby actively changing the orientation of the tilting frame relative to the main frame.

In some embodiments, the sensor can be configured to measure a speed of the motorcycle. The threshold criteria can be a threshold speed.

In some embodiments, the operating parameter can be a travel speed. The controller can be configured to cause the actuator to control the orientation of the tilting frame relative to the main frame, based on the travel speed being below the threshold speed.

In some embodiments, controlling the orientation of the tilting frame relative to the main frame can include locking the orientation of the tilting frame relative to the main frame, based on the travel speed being below the threshold speed.

In some embodiments, the operating parameter can be an acceleration. The sensor can be configured to measure an acceleration of the motorcycle. The threshold criteria can be a threshold acceleration. The controller can be configured to cause the actuator to control the orientation of the tilting frame relative to the main frame, based on the acceleration being above the threshold acceleration.

In some embodiments, controlling the orientation of the tilting frame relative to the main frame can include locking the orientation of the tilting frame relative to the main frame, based on the acceleration being above the threshold acceleration.

In some embodiments, the controller and the sensor can be part of the motorcycle.

In some embodiments, the threshold criteria can include at least one of a speed of the motorcycle, an acceleration of the motorcycle, an inertial value of the motorcycle, a degree of tilting of the motorcycle, a location of the motorcycle, or a motorcycle braking indication.

In some embodiments, the sensor can include an inertial measurement unit, and wherein the sensor data can be an inertial measurement indicative of the orientation of at least one of the tilting frame, or the main frame.

Some embodiments of the disclosure provide a tilt control system. The tilt control system can include a motorcycle having a main frame, a sidecar coupled to the motorcycle and having a tilting frame, and an actuator having one end coupled to the main frame of the motorcycle and another end coupled to the tilting frame of the sidecar. The tilt control system can include a controller in communication with the actuator, the controller to cause the actuator to control the orientation of the tilting frame relative to the main frame.

In some embodiments, the sidecar can include a sidecar enclosure, and a sidecar frame. The tilting frame of the sidecar can be a sidecar tilting frame that is pivotably coupled to the sidecar frame. The sidecar enclosure can be coupled to and supported by the sidecar tilting frame. As the sidecar tilting frame tilts, the sidecar enclosure can also tilt.

In some embodiments, the sidecar can include a sidecar wheel that can be configured to tilt as the sidecar tilting frame and the sidecar enclosure tilt.

In some embodiments, the tilt control system can include a first tie rod that can be pivotally coupled to the motorcycle at one end and to the sidecar tilting frame at another end. The first tie rod can drive tilting of the tilting sidecar frame as the sidecar tilts.

In some embodiments, the tilting sidecar frame can define a tilting axis. The actuator can be coupled to the tilting sidecar frame below the tilting axis.

In some embodiments, the controller can be configured to cause the actuator to control the orientation of the tilting frame by at least one of actively extend or retract the actuator thereby actively adjusting the orientation of the tilting frame relative to the main frame, or prevent extension or retraction of the actuator thereby locking the orientation of the tilting frame relative to the main frame.

In some embodiments, the controller can be configured to cause the actuator to control the orientation of the tilting frame relative to the main frame based on at least one of a speed of the motorcycle being below a threshold speed, or an acceleration of the motorcycle exceeding a threshold acceleration.

Some embodiments of the disclosure provide a computer-implemented method of controlling tilting for a motorcycle system that can use an actuator coupled to a main frame of the motorcycle system and to a tilting frame of the motorcycle system. The method can include receiving, at an electronic control device, sensor data from a sensor, determining, using the electronic device, an operating parameter from the sensor data, and causing, using the electronic control device, the actuator to control the orientation of the tilting frame relative to the main frame based on the sensor data.

In some embodiments, controlling the actuator can include at least one of causing the actuator to lock the current orientation of the tilting frame relative to the main frame, or causing the actuator to retract or extend to actively change the orientation of the tilting frame relative to the main frame.

In some embodiments, the operating parameter can be at least one of a speed of the motorcycle, an acceleration of the motorcycle, or a tracking direction of the motorcycle.

Some embodiments of the disclosure provide a tilt control system for a sidecar and a motorcycle. The tilt control system can include a main frame. The main frame can be configured as part of at least one of the motorcycle and the sidecar. The tilt control system can include a tilting frame, and can include an actuator coupled to the main frame and to the tilting frame. The actuator can be configured to control tilting of the tilting frame relative to the main frame.

In some embodiments, the tilt control system can include a controller in electrical or hydraulic communication with the actuator. The controller can be configured to close a valve within the actuator to fix the orientation between the tilting frame and the main frame.

In some embodiments, the tilt control system can include a controller that can be configured to sense an angular position of the tilting frame. The controller can be configured to secure the tilting frame against tilting relative to the main frame, based on the angular position of the tilting frame.

In some embodiments, the tilt control system can include a controller that can be configured to sense an angular position of the tilting frame, and the tilting frame can secure a sidecar wheel. The controller can be configured to secure the tilting frame against tilting relative to the main frame, based on the angular position of the wheel.

In some embodiments, the tilt control system can include a controller that is in electrical communication with an electrical system of the motorcycle. The controller can be configured to receive data from the electrical system of the motorcycle. The controller can be configured to secure the tilting frame against tilting relative to the main frame, based on the data.

In some embodiments, the controller can be configured to secure the tilting frame against tilting relative to the main frame by opening a valve of the actuator, based on the data.

In some embodiments, the data from the electrical system of the motorcycle can include one or more of a motorcycle speed, a motorcycle tilting degree, a motorcycle acceleration, a motorcycle global positioning location, a motorcycle incline degree, or a motorcycle braking indication.

In some embodiments, the actuator can be pivotally coupled to the tilting frame and the main frame.

In some embodiments, the tilting frame can tilt relative to the main frame at a tilting axis. In some embodiments, the actuator can be pivotally coupled to the tilting frame below the pivoting axis.

In some embodiments, the actuator can be pivotally coupled to the tilting frame in lateral alignment with the tilting axis, when the tilting frame is in a neutral position.

In some embodiments, a sidecar wheel can be coupled to the tilting frame, such that tilting of the tilting frame tilts the sidecar wheel.

Some embodiments of the disclosure provide a sidecar for a motorcycle. The sidecar can include a main sidecar frame supporting a sidecar wheel, and can include a tilting sidecar frame pivotally coupled to the main sidecar frame. The tilting sidecar frame can be configured to tilt the sidecar wheel when the tilting sidecar frame pivots relative to the main sidecar frame. The sidecar can include an actuator pivotally coupled to the tilting sidecar frame and the main sidecar frame, and can include a controller in communication with the actuator. The controller can be configured to close a valve within the actuator, to fix the relative orientation of the sidecar wheel and the main sidecar frame.

In some embodiments, closure of the valve within the actuator can fix the orientation between the sidecar wheel and the main sidecar frame by fixing the orientation between the tilting sidecar frame and the main sidecar frame.

In some embodiments, the controller can be configured to open the valve within the actuator to allow the sidecar wheel to pivot relative to the main sidecar frame.

In some embodiments, the sidecar can include an accelerometer coupled to the tilting sidecar frame. The accelerometer can be in communication with the controller. The controller can be configured to sense an angular position of the tilting sidecar frame based on signals from the accelerometer, and can be configured to actuate the valve of the actuator, based on the angular position of the tilting sidecar frame.

In some embodiments, the sidecar can include an accelerometer coupled to the sidecar wheel. The accelerometer can be in communication with the controller. The controller can be configured to sense an angular position of the sidecar wheel based on signals from the accelerometer, and can be configured to actuate the valve of the actuator, based on the angular position of the sidecar wheel.

In some embodiments, the controller can be in electrical communication with an electrical system of the motorcycle. The controller can be configured to receive data from the electrical system of the motorcycle, and can be configured to actuate the valve of the actuator, based on the data.

In some embodiments, the data from the electrical system of the motorcycle can include one or more of a motorcycle speed, a motorcycle tilting degree, a motorcycle acceleration, a motorcycle global positioning location, a motorcycle incline degree, and a motorcycle braking indication.

In some embodiments, the tilting sidecar frame can tilt relative to the main sidecar frame at a tilting axis. The actuator can be pivotally coupled to the tilting sidecar frame below the tilting axis.

In some embodiments, the actuator can be pivotally coupled to the tilting sidecar frame in lateral alignment with the tilting axis, when the sidecar frame can be in a neutral position.

Some embodiments of the disclosure provide a tilt control system for a sidecar and a motorcycle. The tilt control system can include a main frame, a tilting frame, and an actuator. The actuator can be arranged to tilt the tilting frame relative to the main frame. The actuator can further be configured to retract and extend to control tilting of the tilting frame relative to the main frame. The tilt control system can further include at least one of a first pressure sensor or a second pressure sensor and a controller in communication with the actuator and at least one of the first pressure sensor or the second pressure sensor. The controller can be configured to determine a first pressure or a second pressure based on sensor data received from at least one of the first pressure sensor or the second pressure sensor; compare the first pressure or the second pressure to a threshold criteria; and cause the actuator to control an orientation of the tilting frame relative to the main frame, based on the comparison of the first pressure or the second pressure to the threshold criteria.

In some embodiments, the controller is configured to cause the actuator to control the orientation of the tilting frame by at least one of: causing the actuator to lock the orientation of the tilting frame relative to the main frame; or causing the actuator to retract or extend, thereby actively changing the orientation of the tilting frame relative to the main frame.

In some cases, the tilt control system comprises the first pressure sensor and the second pressure sensor. In various instances, the first pressure sensor is located to sense pressure along a first flow path between a first valve and a first end of a hydraulic cylinder of the actuator and the second pressure sensor is located to sense pressure along a second flow path between a second valve and a second end of the hydraulic cylinder of the actuator. In some embodiments, the controller is further configured to determine the first pressure and the second pressure based on sensor data received from the first pressure sensor and the second pressure sensor.

In various instances, the controller is further configured to compare the first pressure to the second pressure and determine a difference between the first pressure and the second pressure. Comparing the first pressure to the second pressure to the threshold criteria can include comparing the difference between the first pressure and the second pressure to the threshold criteria. Causing the actuator to control the orientation of the tilting frame relative to the main frame, based on the comparison of the first pressure to the second pressure to the threshold criteria, can include causing the actuator to control the orientation of the tilting frame relative to the main frame, based on the comparison of the difference between the first pressure and the second pressure to the threshold criteria. In some cases, the difference is a percentage difference between the first pressure and the second pressure. In various embodiments, when the comparison of the difference between the first pressure and the second pressure to the threshold criteria is outside of the threshold criteria, the controller causes the actuator to lock the orientation of the tilting frame relative to the main frame.

In various embodiments, when an operator input is received to cause the actuator to retract or extend to change the orientation of the tilting frame relative to the main frame, the controller is configured to control the orientation of the tilting frame by overriding the operator input to cause the actuator to lock the orientation of the tilting frame relative to the main frame based on the comparison of the first pressure or the second pressure to the threshold criteria.

In another aspect, a tilt control system comprises a main frame; a tilting frame; a first actuator arranged to tilt the tilting frame relative to the main frame; and a controller in communication with the first actuator. The controller can be configured to cause the first actuator to control an orientation of the tilting frame relative to the main frame based on a pressure detected in the tilt control system being at least one of outside of or within a predetermined threshold.

In some embodiments, the controller is configured to cause the first actuator to control the orientation of the tilting frame by at least one of: actively extending or retracting the first actuator thereby actively adjusting the orientation of the tilting frame relative to the main frame; or preventing extension or retraction of the first actuator thereby locking the orientation of the tilting frame relative to the main frame.

In various cases, the tilt control system comprises a motorcycle that includes the main frame and at least one lateral wheel coupled to the motorcycle by the tilting frame.

In some instances, the tilt control system further includes at least one pressure sensor located along a first flow path between a valve and an end of a hydraulic cylinder of the first actuator. The controller can be configured to receive sensor data from the at least one pressure sensor and detect the pressure based on the sensor data.

In various embodiments, the tilt control system comprises a second actuator arranged to tilt the tilting frame relative to the main frame. The controller can be in communication with the second actuator and configured to cause the first actuator and the second actuator to control the orientation of the tilting frame relative to the main frame based on a comparison of the pressure detected in the tilt control system being with the predetermined threshold.

In some cases, the controller is further configured to detect a first pressure associated with the first actuator and a second pressure associated with the second actuator. Causing the first actuator and the second actuator to control the orientation of the tilting frame relative to the main frame based on the comparison of the pressure detected in the tilt control system with the predetermined threshold further comprises causing the first actuator and the second actuator to control the orientation of the tilting frame relative to the main frame based on a comparison of the first pressure or the second pressure detected in the tilt control system with the predetermined threshold.

In some instances, the controller is further configured to detect a first pressure associated with the first actuator and a second pressure associated with the second actuator. Causing the first actuator and the second actuator to control the orientation of the tilting frame relative to the main frame based on the comparison of the pressure detected in the tilt control system with the predetermined threshold further comprises causing the first actuator and the second actuator to control the orientation of the tilting frame relative to the main frame based on a comparison of the first pressure and the second pressure detected in the tilt control system with the predetermined threshold.

In various embodiments, causing the first actuator and the second actuator to control the orientation of the tilting frame relative to the main frame based on at least one of the first pressure and the second pressure detected in the tilt control system being at least one of outside of or within the predetermined threshold further comprises determining a difference between the first pressure and the second pressure; comparing the difference between the first pressure and the second pressure to the predetermined threshold; and causing the first actuator and the second actuator to control the orientation of the tilting frame relative to the main frame based on the comparison of the difference between the first pressure and the second pressure to the predetermined threshold.

In another aspect, a computer-implemented method of controlling tilting for a motorcycle system, using an actuator coupled to a main frame of the motorcycle system and to a tilting frame of the motorcycle system, the method includes receiving, at an electronic control device, sensor data from at least one of a first pressure sensor or a second pressure sensor; determining, using the electronic control device, a hydraulic pressure of the actuator from the sensor data; and causing, using the electronic control device, the actuator to control an orientation of the tilting frame relative to the main frame based on a determined hydraulic pressure of the actuator.

In some instances, controlling the actuator includes at least one of causing the actuator to lock the orientation of the tilting frame relative to the main frame; or causing the actuator to retract or extend to actively change the orientation of the tilting frame relative to the main frame.

In various cases, the method can further include comparing, using the electronic control device, the determined hydraulic pressure of the actuator to a predetermined threshold. In some cases, causing the actuator to control the orientation of the tilting frame relative to the main frame based on the determined hydraulic pressure of the actuator, further comprises, based on a comparison of the determined hydraulic pressure of the actuator to the predetermined threshold, causing, using the electronic control device, the actuator to control the orientation of the tilting frame relative to the main frame.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

FIG. 3A is an illustration of an example of a tilt control system in a neutral orientation, which is a specific example installation of the tilt control system of FIG. 1.

FIG. 3B is an illustration of the tilt control system of FIG. 3A, in a tilted configuration.

DETAILED DESCRIPTION

Figure 1:
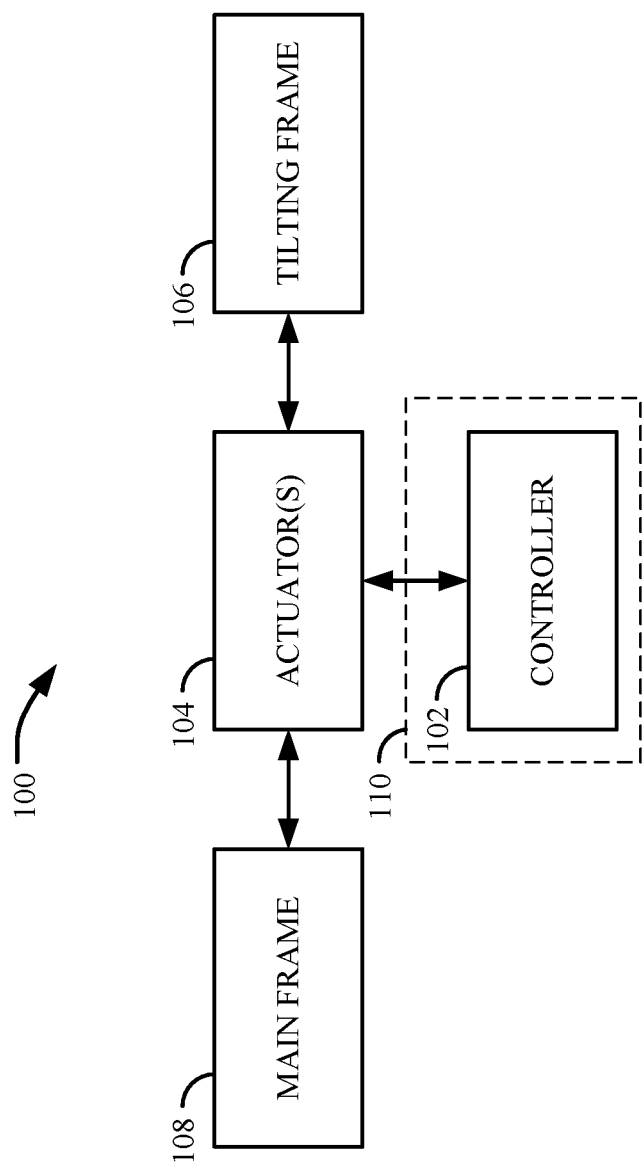
FIG. 1 is a block diagram showing an example of a tilt control system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative to a reference frame of a particular example of illustration.

As used herein, the term, "controller" includes any device capable of executing a computer program, or any device that includes logic gates configured to execute the described functionality. For example, this may include a general or special purpose processor device coupled to a memory, a microcontroller, a field-programmable gate array, a programmable logic controller, etc. In some examples, general or special purpose industrial electronic controllers can be used, including as can be configured using known approaches to receive signals from various sensors as input and provide corresponding command signals as output.

Typically, sidecar wheels are secured and supported on a single side of a sidecar frame. Further, in some recent configurations, a sidecar wheel can tilt with a motorcycle. For example, in some configurations an axle of a sidecar wheel, and associated support structures, can tilt about one or more axes that are substantially parallel to ground and substantially perpendicular to the sidecar wheel axle.

In some cases, a sidecar wheel that can tilt about an axis (e.g., as described above) can provide substantial advantages. For example, a sidecar wheel that tilts with a motorcycle, and in some configurations, with a frame of a sidecar, can allow less experienced motorcycle drivers to more effectively control the sidecar.

Although the ability to tilt a sidecar wheel or sidecar frame can be advantageous, it may sometimes be desirable to selectively prevent or permit rotation of the sidecar wheel or frame. This can be important, for example, to help ensure stability of a sidecar system during certain operating modes or conditions. Generally, the sidecar wheel provides the only lateral point of contact between the road and the sidecar. Thus, if this point of contact is unstable it can cause unwanted slipping of the sidecar wheel, and can cause undesirable tilting of the sidecar frame. Both of these results can decrease stability of the larger sidecar system, and in some cases, can force the motorcycle rider to react quickly to maintain appropriate control (e.g., to shift their weight in the opposite direction). Further, in some contexts, such as at low speeds, overall control to prevent or otherwise reduce tilting may also be helpful. (These considerations can also apply to tilting frames in general, in the context of motorcycle systems, in addition to tilting frames on sidecars as discussed above.)

In view of the issues and desirable benefits noted above, and others, some embodiments of the disclosure provide a tilt control system to prevent (or allow) tilting of a sidecar wheel or a tilting frame during specific situations or based on particular conditions. For example, some embodiments can control the tilting of a sidecar wheel or tilting frame when the motorcycle and sidecar (or other motorcycle systems) are parked, stopped, traveling at a specific speed, or traveling over or under a specific speed or a specific acceleration, or when a sidecar wheel or other tilting frame is tilted at, beyond, or below a specific degree of rotation.

FIG. 1 shows a block diagram of an example of a tilt control system 100, according to some embodiments of the present disclosure. The tilt control system 100 includes a controller 102, an actuator 104, a tilting frame 106, and a main frame 108. As illustrated, the controller 102 is in communication with the actuator 104, which can be for example, a direct wired connection, a wireless connection, a hydraulic connection, or otherwise configured. The actuator 104 as shown, is generally mechanically coupled (e.g., pivotally coupled) to both the tilting frame 106 and the main frame 108, in order to control relative tilting movement between the tilting and main frames 106, 108.

Generally, the tilting frame 106 and the main frame 108, relative to which the tilting frame 106 is configured to tilt, can be configured in a wide variety of ways relative to a motorcycle system. For example, the frames 106, 108 can be included in systems in which a motorcycle is configured to tilt (e.g., lean) relative to a sidecar, in systems in which a motorcycle and a sidecar wheel are configured to tilt relative to a separate sidecar frame, in systems in which a motorcycle and a sidecar (e.g., in a unicycle configuration) are configured to tilt together, or in various other motorcycle systems in which a tilting frame is configured to tilt relative to a main frame.

In this regard, for example, the tilting frame 106 can form part of a sidecar system. For example, the tilting frame 106 can support (or include) a sidecar seat (not shown in FIG. 1), which is configured to tilt with the tilting frame 106. In other configurations, the tilting frame 106 can simply be a component that tilts with a sidecar wheel (e.g., including a sidecar fender) or other component.

Similarly, in some configurations, the tilting frame 106 can be a portion of a motorcycle rather than a sidecar. For example, in some configurations, the tilting frame 106 can be a passive linkage connecting a motorcycle to the sidecar, where the passive linkage "follows" the tilting of the motorcycle.

In some configurations, the main frame 108 can form part of a sidecar system. For example, the main frame 108 can support (or include) a sidecar seat, and can be configured not to tilt relative to a relevant reference frame. In some configurations, the main frame 108 can be a portion of the motorcycle. In some configurations, the main frame 108 can be an intermediate linkage connected between a motorcycle and a sidecar.

Generally, a controller for controlling tilting of a tilting frame can be located at various points on a motorcycle system, in centralized or distributed arrangements. In some embodiments, the controller 102 can also be included on the motorcycle system 110, including on a sidecar of the motorcycle system 110, or a motorcycle of the motorcycle system 110 (e.g., as part of a main control system of the motorcycle). In some embodiments, the controller 102 can be located exclusively on a motorcycle or a sidecar, or can be distributed among multiple locations (e.g., on a sidecar and a motorcycle of the motorcycle system 110).

As described above, the actuator 104 is generally configured to control the tilting of the tilting frame 106 relative to the fixed frame 108. (As discussed herein, control of the tilting of a tilting frame relative to the fixed frame is understood to inherently include control of a fixed frame relative to a tilting frame, given the inherently exchangeable perspective of relative tilting.) In different embodiments, the actuator 104 can be configured for an active tilting control (e.g., actively causing tilting), for a passive tilting control (e.g., allowing or preventing tilting, such as locking and unlocking), or for a combination of active and passive tilting control. Specifically, in some implementations of passive tilting control, the actuator 104 can allow full tilting movement between the tilting frame 106 and the fixed frame 108 without restriction, can allow partially restricted tilting movement, or can fully prevent tilting movement. For example, in some configurations, the actuator 104 can be configured to partially restrict tilting movement by operating in a dampening configuration, as also described below. As another example, in some configurations, preventing or restricting movement by the actuator 104 can be effective via a locked position, or a hard, mechanical stop between components, via a clutch or other similar device, or in other ways.

In order to achieve the different implementations of tilting control, an actuator can embody many different forms. For example, the actuator 104 can be a fluid-based actuator, such as a hydraulic or pneumatic actuator. In some embodiments, a hydraulic actuator can have any of five different hydraulic valve stages, including forcibly (actively) extending, forcibly (actively) retracting, fully open (e.g., free movement such as floating), partially open (e.g., passively restricted movement, such as due to flow restrictions) and closed (no movement such as locked). In some embodiments, the hydraulic actuator can include hydraulic pumps, valves, conduits, motors, etc., to implement this functionality. As another example, the actuator 104 can be a mechanical or electro-mechanical actuator, such as a linear actuator, a friction disk, a pawl, or an electromagnetic actuator.

In some embodiments, an electrical actuator can include electrically activated motors, electrically activated brakes, electrically activated clutches, electrically activated gears, electrically activated ball screws, limit switches, etc., to provide the four desired operating modes of the electric actuator, including forcibly (actively) extending, forcibly (actively) retracting, open (free movement such as floating), and closed (no movement such as locked). In some specific configurations, the electrical actuator can be a linear actuator with an electric holding brake engaged with a screw, which can be released when the motor is energized (driving retraction or extension of the screw of the linear actuator). The brake can be activated to effectively lock the screw of the linear actuator (e.g., the locked actuator configuration). Additionally, with the motor off and the brake off, the screw can be freely moved (e.g., the floating configuration).

In other specific configurations, the electrical actuator can include an electric clutch to improve the back drive efficiency of the actuator (e.g., the allowance of the actuator to be retracted from external forces after having been extended). In some cases, the electric clutch (or other similar systems) can be used as a failsafe during a power loss event, or can be utilized for momentary lunge control. For example, the electric clutch can be electrically activated to cause the actuator to effectively lock (or increase a resistance to movement of the actuator), based on a sensed condition by the controller device. For example, if the controller device determines that the acceleration or speed is greater than a threshold acceleration or speed, the clutch can be activated to effectively lock the actuator (or increase a resistance to movement of the actuator). This can be particularly advantageous to prevent relatively large tilting impulses during certain events or conditions.

In one specific configuration of the tilt control system 100, the main frame 108 can be mechanically linked to a motorcycle (not shown in FIG. 1) of the motorcycle system 110, can accordingly provide support and securement locations for various components of the motorcycle system 110. For example in this configuration the main frame 108 may be generally fixed relative to the motorcycle, or at least not configured for active tilting. Correspondingly, in some configurations, the tilting frame 106 can be pivotally coupled to the main frame 108. In some embodiments, the tilting frame 106 can be configured to be actively tilted by the motorcycle (e.g., tilted in parallel with the motorcycle) and can also control tilting of a sidecar wheel (not shown in FIG. 1). In some embodiments, the tilting frame 106 can support and tilt a variety of other components, such as a seat of a sidecar (not shown). In some embodiments, the tilting frame 106 can be configured only to tilt the sidecar wheel.

In another example configuration of the tilt control system 100, the tilting sidecar frame 106 can be a portion of the motorcycle (not shown) and the main frame 108 can be a sidecar frame that is not intended to actively tilt. Thus, the actuator 104, which is coupled between the tilting frame 106 and the main frame 108, can control the tilting between the motorcycle and the sidecar.

In another example configuration of the tilt control system 100, the tilting sidecar frame 106 can be a component that tilts with a sidecar wheel (e.g., including a fender structure thereof) and the main frame 108 can be a portion of the motorcycle. Thus, the actuator 104, which is coupled between the tilting frame 106 and the main frame 108, controls the tilting between the sidecar wheel and the motorcycle itself.

In another example configuration of the tilt control system 100, the tilting sidecar frame 106 can be the entire sidecar, which is intended to tilt with the motorcycle (e.g., the main frame 108 in this configuration). In this case, the entire sidecar can be attached via a passive linkage, such that as the motorcycle tilts, the tilting sidecar frame 106, configured as the entire sidecar, follows the tilting of the motorcycle. In this configuration, the actuator 104 can be coupled between the tilting frame 106 and the main frame 108 and can accordingly control the tilting between the two components.

Although the discussion of the tilting control system 100 contemplates many different embodiments, the description of tilting relative to another component, such as the tilting frame 106 tilting relative to the main frame 108 is generally directed to the relative tilting of one component to another, from the perspective of either of the components. For example, the tilting of the tilting frame 106 relative to the main frame 108 can occur relative to the coordinate system of the tilting frame 106 (e.g., following a moving coordinate system). Alternatively, the relative tilting of the tilting frame 106 relative to the main frame 108 can occur relative to the coordinate system of the main frame 108 (e.g., following a fixed coordinate system). In some embodiments, the main frame 108 and the tilting frame 106 can both tilt, which will be described in more detail below, which may or may not include relative tilting of the frames 106, 108 relative to each other. Additionally, although a single actuator 104 is shown, in alternative configurations, additional numbers of actuators can be used with other (or the same) main frames and tilting frames.

Figure 2:
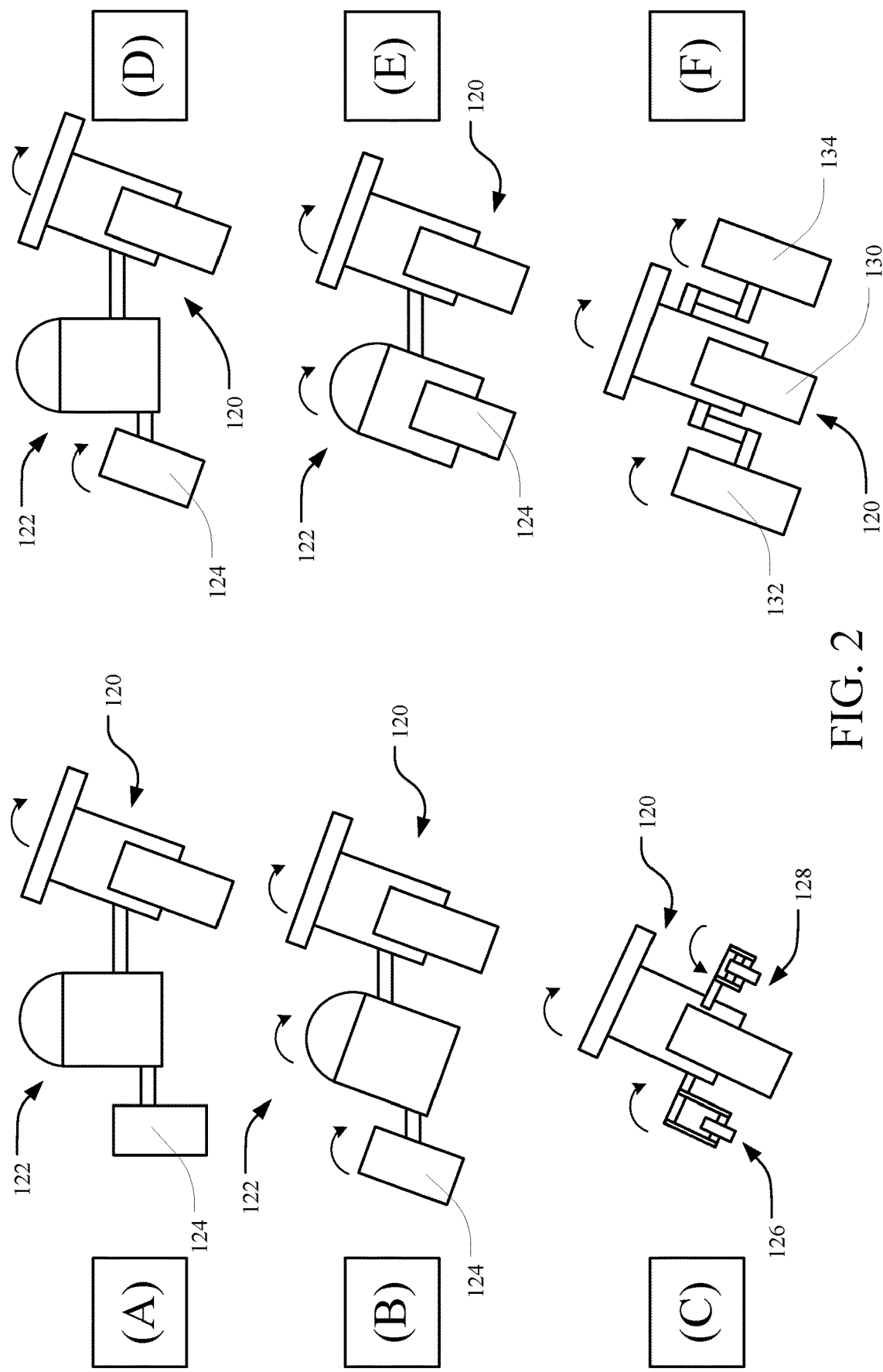
FIGS. 2A-2F show various diagrams of different motorcycle systems that implement the tilt control system of FIG. 1 in different ways.

FIG. 2 provides specific example implementations of the tilting frame(s) 106, the main frame(s) 108, as can be controlled by the actuator(s) 104 (not shown in FIG. 2). The diagram (A) of FIG. 2 shows an example of a motorcycle system including a motorcycle 120, a sidecar 122, and a sidecar wheel 124. As shown by the clockwise arrow, the motorcycle 120 is configured to tilt, while the sidecar 122 and the sidecar wheel 124 are not configured to tilt and therefore remain substantially fixed. Thus, in this configuration, the main frame 108 can be a portion of either the sidecar wheel (or a component coupled to the sidecar wheel), or the sidecar 122, whereas the tilting frame 106 can be a portion of the motorcycle 120 (or a component coupled to the motorcycle 120).

The diagram (B) of FIG. 2 shows an example of a motorcycle system that includes a motorcycle 120, a sidecar 122 and a sidecar wheel 124. In this configuration, the motorcycle 120, the sidecar 122, and the sidecar wheel 124 are all configured to tilt as the motorcycle 120 tilts. For example, although not shown, a tie rod can be pivotally coupled to the motorcycle 120 at one end, and pivotally coupled to the sidecar 122 on the other end (e.g., a tilting sidecar frame). The tie rod effectively drives tilting of the sidecar 122 as the motorcycle 120 tilts. This configuration is similar to the configuration described in the corresponding and currently pending U.S. patent application Ser. No. 16/420,902 entitled, "Suspension System for Sidecars," which is incorporated by reference herein in its entirety for all purposes. Thus, in this configuration, the main frame 108 can be any portion of the motorcycle 120, the sidecar 122, the sidecar wheel 124, and the tilting frame 106 can be any portion of the motorcycle 120, the sidecar 122, the sidecar wheel 124 that is not also the main frame 108.

The diagram (C) of FIG. 2 shows an example of a motorcycle system that includes a motorcycle 120, a first support wheel 126 on one side of the motorcycle 120, and a second support wheel 128 on the opposite side of the motorcycle 120. The first support wheel 126 can tilt relative to the motorcycle 120, and the second support wheel 128 can tilt relative to the motorcycle 120. Thus, similarly to the configuration in diagram (B), a portion of any of the motorcycle 120 and the support wheels 126, 128 can be the tilting frame 106, or the main frame 108. Additionally, in some cases, the support wheels 126, 128 do not rotate but rather only extend or retract. In this case, an actuator can still control the orientation of the support wheels 126, 128 relative to the motorcycle 120 by allowing retraction, allowing extension, actively forcing retraction, or actively forcing extension.

The diagram (D) of FIG. 2 shows an example of a motorcycle system that includes a motorcycle 120, a sidecar 122, and a sidecar wheel 124. The motorcycle 120 and the sidecar wheel 124 are configured to tilt (e.g., as the motorcycle 120 tilts), whereas the sidecar 122 does not tilt (e.g., remains substantially fixed). Thus, in this configuration, a portion of the motorcycle 120 and the sidecar wheel 124 can be the tilting frame 106, and the sidecar 122 can be the main frame 108.

The diagram (E) of FIG. 2 shows an example of a motorcycle system that includes a motorcycle 120 and a sidecar 122 with a sidecar wheel 124 coupled thereto. The motorcycle 120 and the sidecar 122 (along with the sidecar wheel 124) are configured to tilt as the motorcycle 120 tilts. Thus, in this configuration, a portion of the motorcycle 120 and the sidecar 122 can be the tilting frame 106 and a portion of the other can be the main frame 108.

The diagram (F) of FIG. 2 shows an example of a motorcycle system that includes a motorcycle 120 with a central wheel 130, a first lateral wheel 132 on one side of the motorcycle 120, and a second lateral wheel 134 on the opposite side of the motorcycle 120. The lateral wheels 132, 134 are configured to tilt as the motorcycle 120 tilts. Thus, in this configuration, any portion of the lateral wheels 132, 134 (or that connect to the lateral wheels) and the motorcycle 120 can be the tilting frame 106. Additionally, the corresponding other component (e.g., the lateral wheels 132, 134, or the motorcycle 120) can then be the main frame 108.

FIGS. 3A and 3B show an example configuration of a fully assembled tilt control system 200, which is a specific implementation of the tilt control system 100 and is generally compatible with each of the implementations illustrated in FIG. 2. The tilt control system 200 includes many previously described components, and thus the previous discussion of those components (e.g., those having the same identifier) also generally pertain to the tilt control system 200. The tilt control system 200 includes an actuator 204, a tilting sidecar frame 206, and a main sidecar frame 208. The tilting sidecar frame 206 is pivotally coupled to the main sidecar frame 208 at a pin 210, which allows the tilting sidecar frame 206 to tilt relative to an axis 212 (i.e., that intersects the pin 210), in either a counterclockwise or clockwise direction with regard to the view in FIGS. 3A and 3B. The mounting feature 248 of the actuator 204 is pivotally coupled to a cammed (e.g., downward) extension of the tilting sidecar frame 206, which is offset below the axis 212. The other mounting feature 250 of the actuator 204 is pivotally coupled to the main sidecar frame 208.

In different embodiments, different relative orientations of attachment points and pivot axes are possible. For example, as illustrated in FIGS. 3A and 3B, the actuator 204 is pivotally secured to the tilting sidecar frame 206 with the mounting feature 248 below, and laterally aligned with, the axis 212 when the tilting sidecar frame 206 is in a neutral configuration (see FIG. 3A). Similarly, the mounting feature 250 pivotally secures the actuator 204 to the fixed sidecar frame 208 in vertical alignment with the axis 212. In other embodiments, however, other configurations are possible.

In some embodiments, when the actuator 204 is free to move and the tilting sidecar frame 206 tilts in a clockwise direction about the pin 210 (e.g., as driven by a tie rod of a larger tilting system), a free end 214 of the actuator 204 (opposite to the substantially fixed opposing end 216 of the actuator 204) is free to translate relative to other parts of the actuator 204. This translation of the free end 214 of the actuator 204 is shown, for example, by the difference in size of the length of the free end 214 between the configurations of FIGS. 3A and 3B. Further, because the free end 214 of the actuator 204 is free to translate (e.g., based on instructions from the controller), the actuator 204 will generally permit tilting of the tilting sidecar frame 206 relative to the fixed sidecar frame 208. Similarly, in some implementations, a controller can cause the actuator 204 to actively move the free end 214 to actively tilt the tilting sidecar frame 206 relative to the fixed sidecar frame 208.

In contrast, when the free end 214 of the actuator 204 is locked (e.g., prevented from translating, such as based on instructions or a lack of instructions from the controller), the length of the free end 214 will not increase (or decrease), and the tilting sidecar frame 206 will not tilt relative to the main sidecar frame 208. Accordingly, through selective control of the actuator 204 (e.g., by controlling a valve of an actuator), tilting of a tilting sidecar frame relative to a fixed sidecar frame can be selectively allowed or prevented (or otherwise controlled). Further, in configurations in which the tilting sidecar frame 206 drives the tilting of a sidecar wheel, if the tilting sidecar frame 206 is impeded from tilting, the sidecar wheel will be as well.

Although the actuator 204 is illustrated in FIGS. 3A and 3B as being coupled to the tilting sidecar frame 206, other configurations are possible in other embodiments. For example, rather than being pivotally coupled to the tilting sidecar frame 206, the actuator 204 can be pivotally coupled to another component (not shown) that rotates with the sidecar wheel (e.g., a fender). In this configuration, the actuator 204 may then directly prevent or allow rotation of the sidecar wheel, rather than doing so indirectly as in the illustrated embodiment.

In some embodiments, the illustrated mounting location of each of the ends of the actuator 204 relative to the axis 212 can be advantageous. For example, if the mounting feature 248 were to be disposed coincident with the axis 212, or be otherwise too close to the pin 210, the actuator 204 might not as effectively control tilting of the tilting sidecar frame 206.

Although the implementation of FIGS. 3A and 3B includes two parts of a sidecar frame (i.e., the tilting and main sidecar frames 206, 208), other similar configurations may include frames of other parts of a motorcycle system. For example, as generally discussed above, a main or tilting frame can be instead formed as part of a motorcycle rather than a sidecar. Generally, the discussion of the system 200 as illustrated in FIGS. 3A and 3B can also apply to these other configurations.

Figure 4:
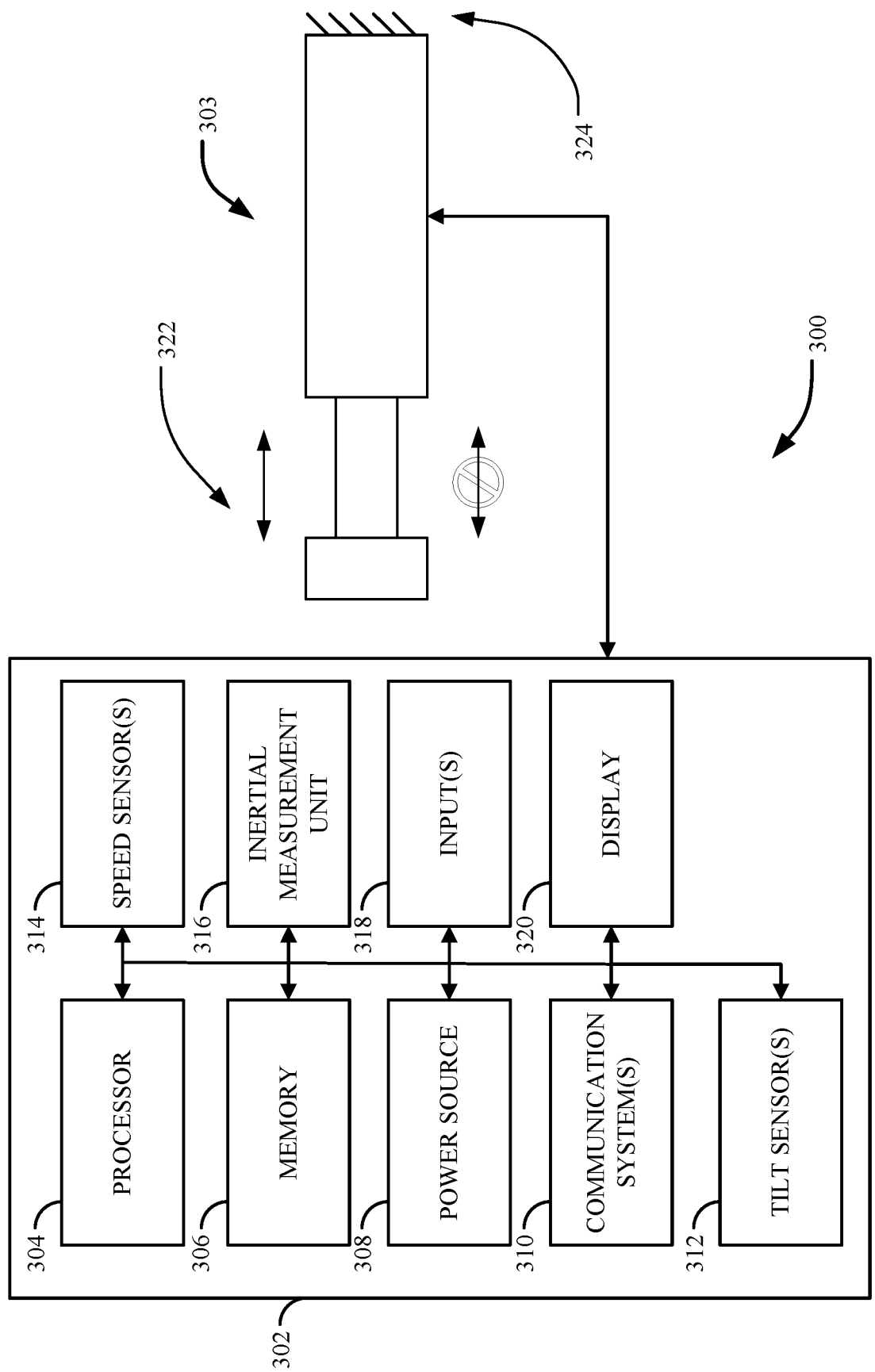
FIG. 4 is a block diagram of another tilt control system having a controller device and an actuator.

FIG. 4 shows an example of a tilt control system 300, such as can be used in systems similar to the systems 100, 200 discussed above. The tilt control system 300 includes a controller device 302 in communication with an actuator 303. The controller device 302 includes a processor device 304, memory 306, a power source 308, communication systems 310, tilt sensors 312, speed sensors 314, an inertial measurement unit 316, inputs and vehicle inputs 318, and a display 320. Each of the subcomponents within the controller device 302 (e.g., the power source 308) are in communication with the other components as shown in FIG. 4, although other configurations are possible in other embodiments. Further, in some embodiments, other sensors or combinations of sensors can be included or otherwise provided to be in communication with a controller.

The processor device 304 generally controls the functionality of the controller device 302, and can instruct the actuator 303, including via direct or indirect electronic, hydraulic, pneumatic or other commands. For example, the processor device 304 of the controller device 302 can implement some or all of the processes (or methods) described in the present disclosure. The processor device 304 can be any suitable hardware processor or combination of processors, such as a central processing unit ("CPU"), a graphics processing unit ("GPU"), etc., which can execute a program (e.g., retrieved from memory 306), including for one or more of the processes described below.

The memory 306 can include any suitable volatile memory, non-volatile memory, storage, or any suitable combination thereof. For example, the memory 306 can include random-access memory ("RAM"), static random-access memory ("SRAM"), read-only memory ("ROM"), electrically erasable programmable read-only memory ("EEPROM"), one or more flash drives, one or more hard disks, one or more solid state drives, one or more optical drives, etc. In some embodiments, the memory 306 can have encoded thereon a computer program for controlling operation of the processor device 304, including as may be interpreted and executed by the processor device 304 to control other devices. For example, the memory 306 can store a program, which controls under what conditions the actuator 303 is to be actively retracted, actively extended, enabled to retract or extend, or locked from retracting or extending.

The power source 308 of the controller device 302 can be embodied in many different forms. For example, the power source 308 can be a hardwired connection (e.g., a wired connection from the motorcycle), or it can be an electrical storage device (e.g., a battery). As appropriate, the power source 308 can supply power to all components included in the controller device 302. Additionally, the power source 308 can provide power to components within the actuator 303, based on the implementation of the actuator 303. For example, the power source 308 can supply power to electrical valves, motors, etc., of the actuator 303, and the processor device 304 can selectively activate these components of the actuator 303 (as described below).

The one or more communication system(s) 310 can include any suitable hardware, firmware, or software for communicating with components external to the controller device 302, including, for example, a communication system within the motorcycle, a smartphone, a global positioning system, etc. For example, the communications system(s) 310 can include one or more transceivers, one or more communication chips or chip sets, etc. In a more particular example, communications system(s) 310 can include hardware, firmware or software that can be used to establish a coaxial connection, a fiber optic connection, an Ethernet connection, a universal serial bus ("USB") connection, a Wi-Fi connection, a Bluetooth connection, a cellular connection, a serial interface connection (e.g., Serial Peripheral Interface ("SPI"), or Inter-Integrated Circuit ("FC")), etc.

In some embodiments, the tilt sensors 312 (e.g., in other words rotation sensors) are sensors that measure the rotation or other orientation of one component relative to a coordinate system. For example, a tilt sensor 312 can be an accelerometer coupled to a main frame of a motorcycle (or other component) that can determine the relative degree (e.g., an angle) of tilting of the motorcycle (or other component) relative to the gravitational vector of earth. In other cases, the tilt sensor 312 can be (or can include) a gyroscope (e.g., a microelectromechanical gyroscope). In some configurations, the tilt sensor 312 can be a hall effect sensor. In some cases, multiple tilt sensors 312 can be deployed to determine the relative rotation between two components or the respective orientation of each of the components. For example, with one tilt sensor 312 coupled to the tilting frame (e.g., the tilting frame 106), and with another tilt sensor 312 coupled to the main frame (e.g., the main frame 108), where both the tilting and main frames tilt relative to a reference frame, the relative tilt (e.g., orientation) between the tilting and main frames can be determined. In particular, if both tilting sensors 312 are deployed using the same coordinate system (or can be referenced to the same coordinate system or reference point), the relative tilt between the tilting and main frames can be readily determined using the processor device 304. As appropriate, and as further described below, a determination of the orientation or relative orientation can be used to control the actuator 303 to allow changes in the orientation of the frames, actively adjust the orientation of the frames, or prevent changes in the orientation of the frames. In some embodiments, the tilt sensors 312 can be one or more component that form part of a conventional motorcycle (e.g., sensors that are typically included within the electrical systems of a motorcycle).

In some embodiments, the tilt sensors 312 can measure the translational movements (e.g., if implemented as an accelerometer) of a component, or the rotational movements of a component (e.g., the roll, pitch, and yaw). These rotational and translational movements can be utilized to adjust the control of the actuator 303, as described below. In some embodiments, the tilt sensor 312 can measure a steering angle of the component that it is coupled to, such as the steering angle (or position) of the motorcycle.

In some embodiments, the speed sensors 314 are sensors that measure the movement properties of a component that the speed sensors 314 have been coupled to. For example, the speed sensor 314 can be a tachometer of a motorcycle engine that can be used to determine the speed, acceleration, etc., and respective changes in speed, acceleration, etc., of the motorcycle. In some cases, the speed sensors 314 can be a rotary encoder coupled to the sidecar wheel (e.g., a fender) to determine the rotational speed of the given wheel to determine the speed, acceleration, etc., of the sidecar wheel. In some embodiments, the speed sensor 314 can be an accelerometer.

In some embodiments, the controller device 302 can include the inertial measurement unit 316 that can measure the force, angular rate, and the orientation of the component that the inertial measurement unit 316 is coupled to. In some embodiments, the inertial measurement unit 316 forms part of the motorcycle. In other cases, the inertial measurement unit 316 can be integrated within one of the previously described frames (e.g., the main frame, or tilting frame) to measure the force, angular rate, and orientation of the frame. In some embodiments, the inertial measurement unit 316 can determine an inertial value of one of the frames (e.g., the moment of inertia of the tilting frame). In some embodiments, the inertial measurement unit 316 can measure the force, angular rate, and orientation about six axes (e.g., three rotational axes, and three translational axes).

The input(s) 318 of the controller device 302 can be embodied in many different forms. For example, the inputs 318 can include inputs, outputs, vehicle inputs, and vehicle outputs. In some embodiments, the inputs 318 can include indicators, sensors, actuated buttons, data-in pins/connections, data-out pins/connections, General Purpose Input Output ("GPIO") pins/connections, etc. For example, the inputs 318 can include, or can include connections for, an accelerometer, a temperature sensor, a rotary encoder, a light emitting diode ("LED"), a brake light, etc. More specifically, for example, the accelerometer can be mounted on a portion of the sidecar wheel, a portion of the tilting sidecar frame 106, a portion of the motorcycle, or any component that is related to the tilting of the sidecar wheel. As another example, the rotary encoder can be positioned such that it can measure the velocity of the sidecar wheel, the directional rotation of the sidecar wheel (e.g., about the axle), the acceleration of the sidecar wheel, etc.

In some embodiments, the inputs 318 can include buttons, switches, etc., and can include sensors such as vibration sensors (e.g., for a suspension system), pressure sensors, a guided positioning system, humidity sensors, temperature sensors, a fog sensor, optical sensors, moisture sensors, traction sensors, etc.

In some embodiments, the inputs 318 can include vehicle input(s) enabling the controller device 302 to receive and utilize data from the motorcycle (e.g., data including motorcycle speed, motorcycle tilting degree, motorcycle acceleration, motorcycle global positioning location, motorcycle incline degree, motorcycle braking indication, etc.). For example, the vehicle input(s) can include various data lines emanating from the motorcycle and manually connecting to the controller device 302, which can provide, for example, a connection to a controller area network ("CAN") bus. Specific data lines can include dedicated or combined lines for vehicle speed, vehicle tilt, vehicle positioning, etc. Further, although the vehicle input(s) are described as wired connections between the controller device 302 and the electronic system of a motorcycle, in some embodiments the controller device 302 can communicate in other ways with the electronic system of the motorcycle (e.g., via the communication system(s) 310). For example, the controller device 302 can receive data from the electronic system of the motorcycle wirelessly, with the data originating from any number of sensors on the motorcycle. As also described above, examples of sensors within the motorcycle can include a speedometer, a brake light, an accelerometer, a global positioning system, etc.

Generally, based on processing of received or internal data, the controller device 302 can command external devices. For example, the controller device 302 can be configured to control the actuator 303 to control relative tilting (or orientation of, such as the extension or retraction of the actuator 303) of the tilting frame (e.g., the tilting frame 106), or the main frame (e.g., the main frame 108) as also described below. In some configurations, the controller device 302 can instruct the electronic system of the motorcycle to process the data or to implement appropriate control functionality.

In some embodiments, the controller device 302 can include the display 320. In some embodiments, the display 320 can present a graphical user interface. In some embodiments, the display 320 can be implemented using any suitable display devices, such as a monitor, a touchscreen, a television, etc. In some embodiments, the inputs 318 of the controller device 302 can include indicators, sensors, actuatable buttons, a keyboard, a mouse, a graphical user interface, a touch-screen display, etc.

In some embodiments, components of the controller device 302 can be entirely part of a motorcycle, or in some cases, some components of the controller device 302 are part of the motorcycle while other components of the controller device 302 are part of other systems, such as the sidecar.

As shown in FIG. 4, the actuator 303 is fixed at one end 324, while the opposing free end 322 of the actuator 303 can be controlled by the controller device 302. More specifically, the controller device 302 (e.g., via the inputs 318) can cause the free end 322 of the actuator 303 to actively retract, actively extend, to allow for unobstructed extension or retraction (e.g., unlocked), and to prevent extension or retraction (e.g., locked). This control schemes of the actuator 303 can be accomplished in many ways depending on the implementation of the actuator 303. For example, the controller device 302 can cause valves, pumps, motors, etc., of the actuator 303 to begin, stop, or otherwise be appropriately adjusted, based on data received and processed by the controller device 302.

Figure 5:
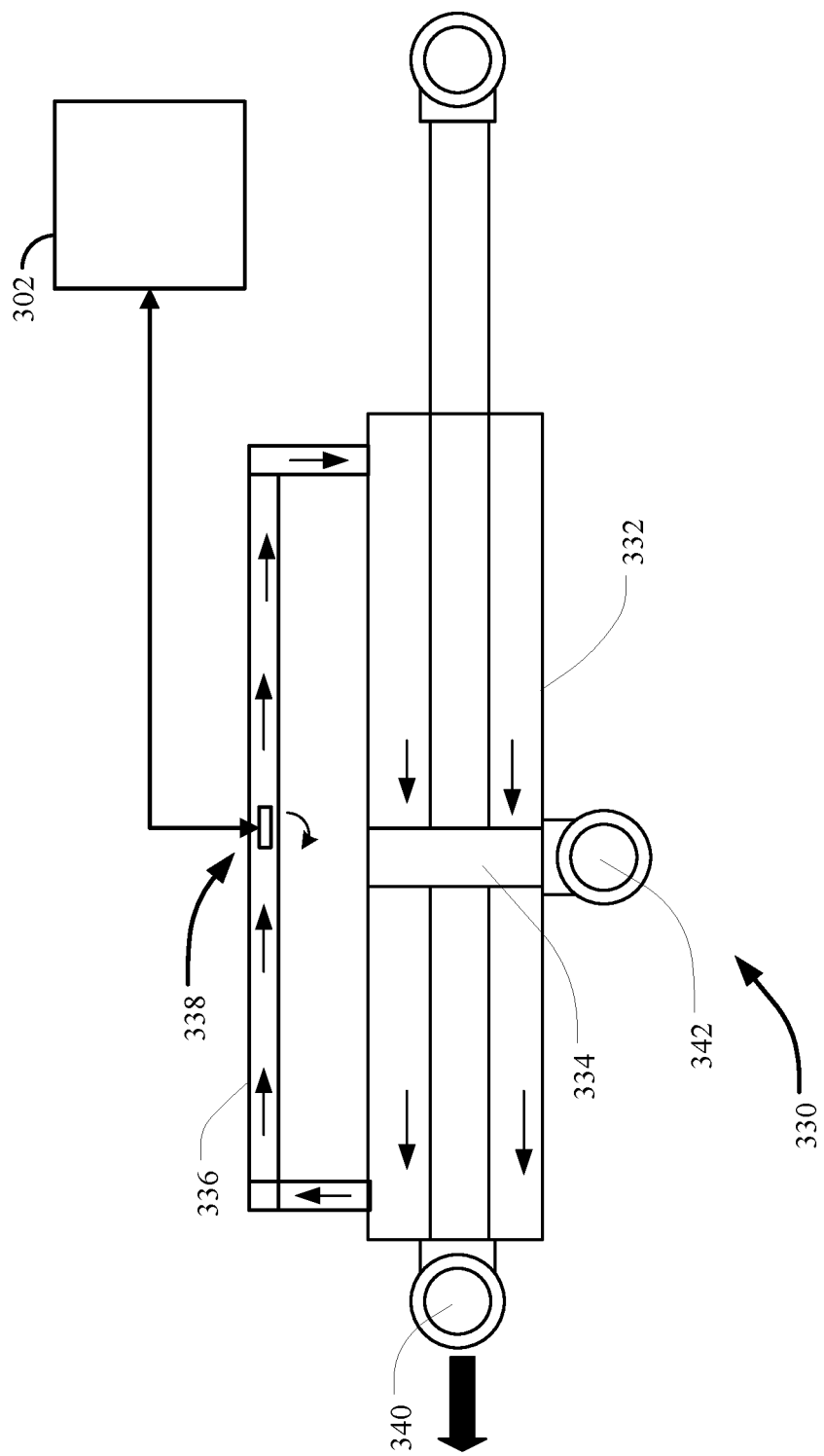
FIG. 5 is a schematic view of a hydraulic actuator, which is a specific implementation of the actuator of FIG. 4, controlled by the controller device of FIG. 4.

As generally discussed above, actuators for use in various embodiments disclosed herein can take a variety of forms, including hydraulic, pneumatic, electronic, or other actuators. FIG. 5 illustrates a specific implementation of the actuator 303, where the actuator 303 is implemented as a hydraulic actuator 330. In the embodiment illustrated in FIG. 5, the hydraulic actuator 330 is configured as a piston actuator, with a housing 332 that defines an interior volume of the hydraulic actuator 330, and a piston 334 within the interior volume. Extending outwardly from opposing ends of the hydraulic actuator 330, is a channel 336 (or other flow path) that allows for fluid communication between the opposing ends of the interior volume of the hydraulic actuator 330. An actuatable valve 338 is situated within (e.g., at a central region of) the channel 336 and is configured to be controllably actuated between at least two configurations. A first (open) configuration (as shown in FIG. 5) allows fluid to flow freely through the channel 336, between opposing sides of the internal volume of the hydraulic actuator 330 and opposite sides of the piston 334. A second (closed) configuration effectively blocks fluid flow between opposing ends of the interior volume of the hydraulic actuator 330, as will be described below.

In some embodiments, the valve 338 can be controllably actuated between one or more intermediate configurations, such as between the first and the second configuration noted above, to further control the extent and direction to which fluid can flow through the channel 336. For example, in some configurations, the valve 338 can allow a throttled fluid flow between the opposing ends of the interior volume of the hydraulic actuator 330. Specifically, the degree of opening/closing of the valve 338 can determine how readily the fluid can flow through the system, which can impact the ability of the piston 334 to move within the internal volume and thereby create a dampening effect. More specifically, as the valve 338 is actuated to a position more closely aligned with the closed position, the ability of the piston 334 to move within the internal volume is impeded, effectively increasing the dampening effect. Conversely, as the valve 338 is actuated to a position more closely aligned with the open position, the ability of the piston 334 to move within the internal volume is increased, effectively decreasing the dampening effect. Thus, components which are connected to the hydraulic actuator 330 (e.g., the tilting frame 106 and the main frame 108) can be controlled, such that a degree of the movement of the components relative to each other can be dampened by the hydraulic actuator 330.

As shown in FIG. 5, the controller device 302 is electrically connected to (or in electrical communication with) the valve 338 to control the valve 338, which can be, for example, a solenoid valve, a motorized valve, etc. Further, as described above, the valve 338 can be powered by the power source 308, or in other configurations, can be powered by a direct connection from the motorcycle (e.g., the motorcycle battery). Although electronic control of the valve 338 is generally described herein and may be advantageous in some implementations, other approaches are also possible, including a hydraulically implemented valve control (e.g., via a pilot-operated valve).

In some embodiments, although not shown explicitly, the controller device 302 can cause the actuator to actively retract or extend. For example, a hydraulic pump having a reservoir can be in communication with the interior volume of the hydraulic actuator 330, and controllable by the controller device 302. Thus, if the valve 338 is in an open position (e.g., allowing fluid flow between the two ends of the hydraulic actuator 330) by instruction from the controller device 302, the controller device 302 can cause the hydraulic pump to activate driving fluid into an end of the interior volume of the hydraulic actuator 330 thereby actively driving extension (or retraction) of the piston 334 of the hydraulic actuator 330. It can be appreciated that the hydraulic pump can be fluidly connected to both ends of the hydraulic actuator 330 to cause extension of the piston 334 when fluid is driven into one end, and retraction of the piston 334 when fluid is driven into the opposing end.

The hydraulic actuator 330 also includes a mounting feature 340, which is coupled to the piston 344 at an end of the hydraulic actuator 330, and a mounting feature 342 that is coupled to a side of the housing 332 of the hydraulic actuator 330. As also described below, the mounting features 340, 342 can be used to pivotally (or otherwise) secure the hydraulic actuator 330 to extend between select components (e.g., the tilting frame 106 and the fixed frame 108). Although a variety of actuators can be used, the piston 334 in the illustrated example includes a cylinder that effectively creates a seal between the opposing ends of the interior volume of the hydraulic actuator 330. A first shaft of the piston 334 extends from one side of the cylinder, and a second shaft of the piston 334 extends from the opposing side of the cylinder, as shown in FIG. 5. This configuration can be particularly advantageous in that in an unlocked position (or when the valve 338 is partially open) the same amount of fluid enters one end of the channel 336 and exits out the other end of the channel 336 (and vice versa). Thus, in some configurations, the hydraulic actuator 330 can operate as a closed system without the need for a fluid reservoir (e.g., a hydraulic fluid reservoir, such as when active extension or retraction of the piston 334 is not utilized such as without fluid reservoirs and corresponding fluid pumps).

When the valve 338 is in an open configuration, fluid within the hydraulic actuator 330 (e.g., an incompressible fluid such as water, hydraulic oil, etc.) can flow freely through the channel 336 in either direction, such that the fluid can flow from one end of the hydraulic actuator 330 to another end. Thus, if an axial force is imposed on the mounting feature 340, the piston 334 can move freely within the internal volume, at least until the piston 334 contacts an end of the housing 332 (or another stop), which would prevent further movement of the piston 334. Conversely, when the valve 338 has been actuated (e.g., via the controller device 302) to the closed configuration, the fluid can no longer flow through the channel 336, and thus the fluid is prevented from flowing from one side of the hydraulic actuator 330 to the opposite side. This can effectively "lock" the position of the piston 334, preventing further movement of the piston 334. As such, the length defined between the respective mounting features 340, 342 is fixed, at least until the valve 338 is actuated to an open configuration (or an intermediate configuration). Thus, for example, when the hydraulic actuator 330 extends between a tilt frame and a fixed frame, the hydraulic actuator 330 can be controlled, via control of the valve 338, to allow or prevent certain relative movement of the tilt and fixed frames. Additionally, as described above, the controller device 302 can deactivate, activate, or adjust operation of hydraulic pumps (and other hydraulic valves) that can actively force the piston 334 of the hydraulic actuator 330 to forcibly retract or extend (e.g., based on the position of the valve 338).

Although FIG. 5 shows a specific implementation of the actuator 303 as being a hydraulic actuator 330, in other configurations the actuator 303 can be other electrically operated actuators, such as, for example, linear actuators. In this case, the electrically operated actuator can include typically used components such as ball screws, clutches, brakes, screws (e.g., lead screws, ACME screws, etc.), gears, limit switches, etc., to implement the functionality of the actuator 303. For example, these components can be utilized for active, forcible extension or retraction of the electrically operated actuator. Additionally, clutches, brakes, etc., can then be utilized to allow actuator to be locked or unlocked (e.g., allow free movement of the free end of the actuator, such as allowing back driving of the actuator).

Figure 6:
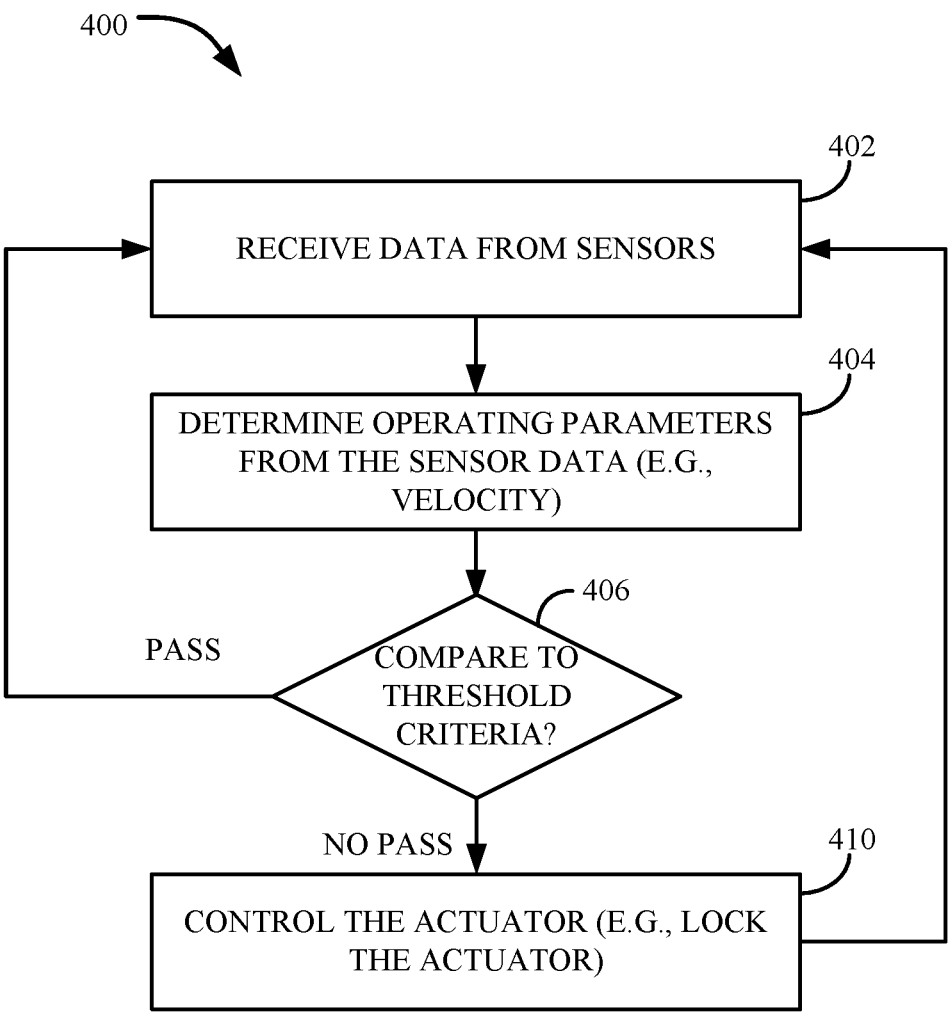
FIG. 6 shows a flowchart of a process for controlling relative tilting of a main frame and a tilting frame.

FIG. 6 shows an example of a process 400 for controlling an actuator coupled to a main frame and to a tilting frame, which can be implemented on any suitable computing device (e.g., the processor of the controller device 302). The actuator can be coupled to the tilting frame, and to the main frame, to control the orientation of the tilting frame relative to the main frame (and vice versa). Controlling the orientation of the tilting frame relative to the main frame can sometimes include preventing or allowing extension and retraction, such that a free end of the actuator is in a locked state, or an unlocked state. Similarly, controlling the orientation of the tilting frame relative to the main frame can sometimes include forcibly retracting or forcibly extending the free end of the actuator. As described previously, it can be appreciated that control of the orientation of the main frame relative to the tilting frame can sometimes include control of an actuator to match how a tilting frame extends (or retracts) relative to a main frame. For example, where main and tilting frames both tilt together, and an actuator can be controlled to extend (or retract) to adjust the position of a portion (e.g., an end) of the tilting frame relative to the main frame (e.g., the support wheel 126 extending or retracting relative to the motorcycle 120 in diagram (C) of FIG. 2).

The process 400 can include receiving 402 data from sensor(s). As described above, the sensors can be embodied in many different ways. For example, the sensors can include tilt sensors, speed sensors, internal measurement units, buttons, vibration sensors, guided positioning systems, humidity sensors, temperature sensors, fog sensors, moisture sensors, traction sensors, etc. In some embodiments, the data can be received form the sensors at preset intervals of time. In some cases, the sampling rate of a particular sensor can be different for different sensors, as appropriate. For example, an ambient temperature senor likely does not need to be sampled repeatedly at high rates, as fluctuations in ambient temperature may not necessitate control of the actuator (e.g., because the ambient temperature fluctuations may be negligible). Alternatively, sensors such as the speed sensor (e.g., a speedometer) may need to be sampled more frequently at higher rates, as speed fluctuations can impact control of the actuator.

Process 400 can also include determining 404 operating parameters from the received 402 sensor data. In some cases, the operating parameters can include raw sensor data. In some cases, the operating parameters need to be derived from raw (or other) sensor data to determine a meaningful parameter to control the actuator. For example, speed sensor data over a time period can be used to extract acceleration information (e.g., changes in speed over time) including acceleration (over time), and changes in acceleration (over time). In some embodiments, the tilting sensor data over time can be used to determine an angular rate of change between the two components coupled by the actuator. In some embodiments, the vibration sensor data over time can be used to determine vibration changes over time.

Process 400 also includes comparing 406 the operating parameter (e.g., based on raw or processed sensor data) exceeds a threshold criteria. Such a comparison to a threshold criteria can be implemented in many different ways, and can include threshold ranges, specific threshold values (e.g., maxima or minima), etc. For example, the threshold criteria can be a speed range, a speed value, an acceleration range, an acceleration value, a tilting range, a tilting value, an elapsed braking time, a braking indication, an elapsed actuated button time, an actuated button indication, a directionality range (over time), a directionality value, etc. As a specific example, in some embodiments, the sensors can include an accelerometer (or speed sensors) and the threshold criteria can be an upper limit acceleration value. As another specific example, the operating parameter can be a change in acceleration, and the threshold criteria can be an upper limit change in acceleration. If the comparison 406 of the operating parameter indicates a passed condition (e.g., if the operating parameter is within the limits of a range indicated by the threshold criteria, below an upper limit indicated by the threshold criteria, above a lower limit indicated by the threshold criteria, etc.), process 400 can proceed back to 402 to receive data from the sensors (again). Alternatively, if the comparison 406 of the operating parameter indicates a not passed condition (e.g., if the operating parameter is outside of a range indicated by the threshold criteria, above an upper limit indicated by the threshold criteria, below a lower limit indicated by the threshold criteria, etc.) process 400 can proceed to control 410 of an actuator.

In this regard, for example, process 400 can include controlling 410 an actuator, based on operating parameters not passing a comparison to a threshold criteria. For example, as described above, control of the actuator can include forcibly extending or retracting the free end of the actuator, thereby changing the orientation (e.g., a rotation degree) of the tilting frame relative to the main frame. Additionally or alternatively, control of the actuator can include allowing the free end of the actuator to extend or retract, or in other words, unlocking the actuator. Additionally or alternatively, control of the actuator can include preventing the free end of the actuator from extending or retracting, or in other words, locking the actuator. In some embodiments, allowing the free end of the actuator to extend or retract can include a degree of allowing (or restricting) movement of the free end. For example, a resistance to movement of the free end of the actuator can be decreased (or increased) as appropriate to control how the free end of the actuator can extend or retract in response to forces imposed on the free end of the actuator. As a more specific example, the resistance to movement of the free end of the actuator can be adjusted, based on an orientation of a valve of a hydraulic actuator (e.g., the valve 338 of the hydraulic actuator 330).

In some specific examples, it may be desirable to prevent rotation of the tilting frame (and thus to prevent rotation of the sidecar wheel), based on particular states of a motorcycle or sidecar (or other factors), as indicated by particular input data. For example, when a motorcycle system similar to that shown in diagram (B) of FIG. 2 is stopped, the motorcycle rider shifting their weight such that the motorcycle tilts could cause the tilting frame to rotate (e.g., via a tie rod) and thus cause tilting of the sidecar wheel. This may be undesirable because, when stopped, a tilting sidecar wheel may not provide sufficient support for the larger sidecar assembly. Thus, in some embodiments, the controller device (e.g., the controller device 302) can receive data from a speed sensor, such as a sensor on the motorcycle (e.g., a speedometer) or on the sidecar (e.g., a rotary encoder that measures the speed of the sidecar wheel) to determine when to control an actuator to allow or to prevent tilting. For example, if the controller device determines that the motorcycle (or the sidecar wheel speed) is below a threshold speed value, the controller device can cause an actuator to prevent tilting of the tilting frame. Similarly, for example, upon the controller device sensing that the motorcycle or sidecar wheel speed is above a threshold speed value, the controller can allow movement of the free end of the actuator to allow tilting of the tilting frame.

In other specific examples, a controller device can lock the actuator when the motorcycle brake is determined to be on. For example, the sensor can be an optical sensor that can determine that the motorcycle brake is on, or the sensor can be a data line (e.g., from the motorcycle electronic system) that provides data to the controller device that the brake has been initiated, or has not been initiated. In some cases, the controller device can determine an elapsed time since the motorcycle brake has been initiated to control the actuator. In this case, the controller device can gradually allow (or prevent) tilting by gradually adjusting the resistance to movement of the free end of the actuator that can mitigate abrupt orientation changes of the actuator (and the frames that are connected to the actuator). As a more specific example, process 400 can determine that the brake has been activated to prevent further extension of the actuator. Then, if the brake has been continuously activated for an additional period of time that exceeds a first threshold elapsed time period since the brake was on, the controller device can instruct the actuator to allow movement of the free end of the actuator, but with an increased resistance to movement of the free end of the actuator (e.g., by opening a valve a substantially small amount). Then, process 400 can determine that the brake has been continuously active for a period of time that exceeded a second threshold elapsed time period since the brake was on, which is greater than the first threshold time period, and can further decrease the resistance to movement of the free end of the actuator (e.g., from the resistance to movement after the first elapsed time period, for example, by further opening the valve). This implementation can prevent abrupt (and uncomfortable) changes in orientation of the frames (e.g., a person located in a sidecar).

In some other specific examples, the controller device can lock the actuator when the orientation of a tilting frame (e.g., a sidecar wheel) is at, below, or above a particular angle relative to a surface of a road or other ground reference (e.g., relative to a front view of the wheel, such as in the view illustrated in FIG. 2 and being a threshold criteria).

In some other examples, it may be desirable to limit the maximum degree of tilting for a tilting frame. For example, a controller device can be configured to sense the orientation of a tilting frame (e.g., via an accelerometer). When the orientation of the tilting sidecar frame or the sidecar wheel reaches a certain tilting angle, the controller device can cause the actuator to lock, and thereby prevent any further tilting of the tilting frame. In some configurations, this approach can also be combined with directional sensing, such that the controller device may allow movement of the actuator that would preserve a tilting angle within a desired range but may not allow movement of the actuator that would raise or lower a tilting angle outside of a desired range.

In other examples, it may be desirable to allow free movement of a free end of the actuator, only when certain conditions are met. For example, the actuator can begin in a locked state (e.g., the valve being closed, such as when the brakes of the motorcycle have been activated). Then, only once certain condition(s) have been met will the controller device allow the actuator to freely extend (or retract) to allow the tilting frame to tilt relative to the main frame. In different embodiments, different conditions can be used. As an example, tilting can be enabled (or disabled) based on conditions that include detection of an incline degree above or below a certain value, measured by the accelerometer. As another example, tilting can be enabled (or disabled) based on conditions that include detection of a speed above or below a certain value (e.g., as measured by a speedometer or rotary encoder).

In still further examples, it may be advantageous to actuate a button to allow or prevent movement of the free end of the actuator, to rely on the discretion, experience, etc., of the motorcycle rider. For example, if the motorcycle rider is stopped, the rider can depress a button to a first position (or press a graphical icon on a touch screen display), which is in communication with the controller device, such that the controller device causes the actuator to lock. Similarly, prior to turning, the motorcycle rider can re-actuate the button to a second position (or press a graphical icon on the touch screen display), such that the controller causes the actuator to allow free movement of the free end of the actuator. In some more specific examples, a display on the motorcycle can display a graphical slider, or a graphical wheel, that has a plurality of positions that can allow a user to adjust the resistance to movement of the free end of the actuator. For example, prior to turning on a windy road, the motorcycle rider can decrease the resistance to movement of the free end of the actuator. Then, when the road returns to being substantially straight, the motorcycle rider can adjust the slide or wheel to a different position that allows for an increase in resistance to movement of the free end of the actuator. In different embodiments, the graphical slider or wheel can be a physical slider or wheel having a plurality of positions. In some embodiments, these buttons, switches, sliders, wheels, etc., can be conveniently located on the handlebar(s) of the motorcycle. In some cases, a light (e.g., a light emitting diode) can be activated when the button or switch is activated. In some configurations, the light can flash (e.g., blink repeatedly) when the button or switch is activated.

In some specific examples, the sensors can include speed sensors that measure the speed of a component of the motorcycle system. The controller device can then compare this speed value to a threshold speed value. Then the controller can, based on the speed value being below the threshold speed value, cause the actuator to lock. This can be particularly advantageous when the motorcycle system having a tilting sidecar wheel is operating at relatively slow speeds (e.g., when parked or at parking lot speeds), where the motorcycle may be maneuvered frequently, but because of the slow speed movement of the tilting frame is not desirable.

In other specific examples, the sensors can measure the acceleration of a component of the motorcycle. The controller device can then compare the rate of acceleration to a threshold acceleration value, and based on the rate of acceleration being greater than the threshold acceleration value can cause the actuator to lock to prevent tilting, or to unlock thereby allowing the tilting frame (e.g., the sidecar wheel) to tilt relative to the main frame. This can be advantageous in that at relatively high accelerations tilting of the tilting frame may not be desired (e.g., to prevent lunging of the sidecar).

In some specific examples, the sensors can be directionality sensors (e.g., accelerometers, the inertial measurement unit, gyroscopes, etc.) to detect steering positions of a component of the motorcycle system. The controller device can then compare the current direction (or a direction value) to the threshold criteria being a direction value (e.g., a steering angle), and based on the current direction being less than the direction value, can cause the actuator to unlock (e.g., from a locked position). In some cases, the controller device can allow the actuator to freely move (e.g., unlocking the actuator) only after detecting that the motorcycle system has traveled in a substantially straight direction (e.g., deviating by less than 100 from straight) for a period of time. Additionally, the controller device can allow the actuator to be unlocked only after, the controller device detects a substantially straight direction (for a period of time), and a relatively low tilting angle (e.g., a neutral tilting orientation of the tilting frame relative to the main frame, or in other words a relatively low angle between the tilting and main frame). These conditional parameters for controlling the actuator can be advantageous in that the tilting frame at times, should only be enabled to be tilted prior to the motorcycle system engaging a turn, and the tilting frame being relatively straight.

In some embodiments, the steering rate at a given point in time can be compared to a threshold steering rate (e.g., value at a given time, or curve over time), and if the current steering rate at the given time is greater than the steering rate threshold, the controller device can cause the actuator to lock.

In some specific examples, the sensors can include a global positioning system or other system such as a communication device that can receive location data of the motorcycle system to determine a location (e.g., a country, a continent, a region) the motorcycle system is operating in. Then, the controller device can determine whether the location has exceeded a geographical boundary region (e.g., a threshold criteria) to initiate control of the actuator. For example, the location data going beyond a boundary region can be indicative of the motorcycle entering a bad weather region (e.g., lower than desired temperature region), and that the actuator should lock or operate in a restricted mode.

In other specific examples, the sensors can include an ambient temperature sensor to determine an ambient temperature the motorcycle system is operating in. Then, the controller device can determine that the ambient temperature is below a temperature threshold value (e.g., a threshold criteria such as a freezing temperature of water), and based on this determination, the controller device can cause the actuator to lock. This can be advantageous in that substantially lower ambient temperatures can be related to the possibility of ice on the road, where tilting may not be desired.

In some specific examples, the sensors can include a vibration sensor to determine a vibration value of a component of the motorcycle system (e.g., the suspension system of a motorcycle system). Then, the controller device can determine that the vibration value is greater than a vibration threshold value (e.g., threshold criteria), and based on this determination, the controller device can cause the actuator to lock. This can be advantageous in situations that tilting may need to be prevented in generally poorer roads (e.g., bumpy roads that engage the suspension system).

In some embodiments, comparison 406 of operating parameters under the process 400 can include comparing multiple threshold criteria. For example, in some embodiments, multiple operating parameters (e.g., multiple sets of sensor data) can be compared to a respective threshold criteria to determine whether or not a particular operating parameter passes (e.g., satisfies) or does not pass (e.g., does not satisfy) its respective threshold criteria, and the outcome of all, or some, or none of these comparisons can cause the process 400 to proceed to the control 410 of an actuator, or to return to receiving 402 further data. For example, in some cases, a travel speed of the motorcycle is below a threshold speed value, and if the acceleration value of the motorcycle is higher than a threshold acceleration value, the process 400 can control 410 the actuator to lock the current orientation of the actuator (or retract the actuator).

As another example, if the acceleration value of the motorcycle is lower than a threshold acceleration value, and the travel speed of the motorcycle is greater than a threshold speed value, the process 400 can proceed to control 410 the actuator to allow free movement of the free end of the actuator (e.g., unlock the actuator). As yet another example, the controller device can control an actuator based on an angular orientation of a tilting frame (e.g., a sidecar wheel) being greater than a threshold tilting value, and a detected speed (e.g., of a motorcycle) exceeding a threshold speed value (e.g., a lower limit speed value).

Generally, including as partly discussed above, threshold criteria can relate to any variety of operating parameters, including parameters relating to a motorcycle system specifically and parameters relating to the surrounding environment. Thus, for example, in some embodiments, the threshold criteria can be a location range, a specific location, a vibration range, a vibration value, a traction range, a traction range, a humidity range, a humidity value, a moisture range, a moisture value, a fog level range, a fog level value. In some embodiments the sensors can be traction sensors to measure a traction level of the road (or other surface), an optical sensor (such as a camera) to acquire images and to correspondingly implement appropriate image analysis for determining various values (e.g., traction values from image analysis of the road to determine a surface texture of the road, a fog level, etc.).

In some embodiments, the sensors can be non-manual input devices. For example, non-manual input devices can be on or off input devices that when engaged forcibly extend or forcibly retract the actuator.

In some embodiments, the actuators can include manual stops or switches (e.g., for valves) that can prevent movement of the free end of the actuator, or can otherwise lock the actuator. This can be advantageous for scenarios in which the motorcycle system has been parked, and the manual stop or switch can add redundancy to the system (e.g., similarly to an emergency brake of a vehicle).

In some examples above, fluid-based actuators and valve-based control thereof are specifically described. In other embodiments, however, other configurations are possible, including configurations with electronic or non-fluid, mechanical actuators (e.g., including gear rack drive devices). Those of skill in the art will recognize that discussion regarding fluid-based actuators above, including discussion of controlling such actuators via control of a valve, can be generally applied to other types of actuators, with known control devices used, as needed, in place of a control valve.

In some examples, it may be desirable to selectively prevent or permit tilting of a sidecar wheel or frame (e.g., FIG. 2, embodiments A, B, D, and E), support wheel(s) or frame (e.g., FIG. 2, embodiment C), and/or lateral wheel(s) or frame (e.g., FIG. 2, embodiment F) based on a pressure detected in an actuator (e.g., hydraulic actuator 330 of FIG. 5 or a pneumatic actuator). This can be important, for example, to help ensure stability of a sidecar system, support wheel system, or lateral wheel system during operation.

In view of the issues, some embodiments of the disclosure provide a tilt control system that can prevent (or allow) tilting of a sidecar wheel or a tilting frame, support wheel(s) or frame, and/or lateral wheel(s) or frame in response to detection of specific pressure conditions for an actuator. For example, some embodiments can control the tilting of a sidecar wheel or tilting frame based on whether hydraulic pressure is appropriately balanced across opposing sides of an actuator (or multiple actuators). For example, tilting may be locked or enabled depending on whether the pressure difference between different locations of an actuator system (e.g., at opposing sides of a piston) is within or outside a particular threshold, or other comparison of the pressure of different locations of an actuator system.

Figure 7:
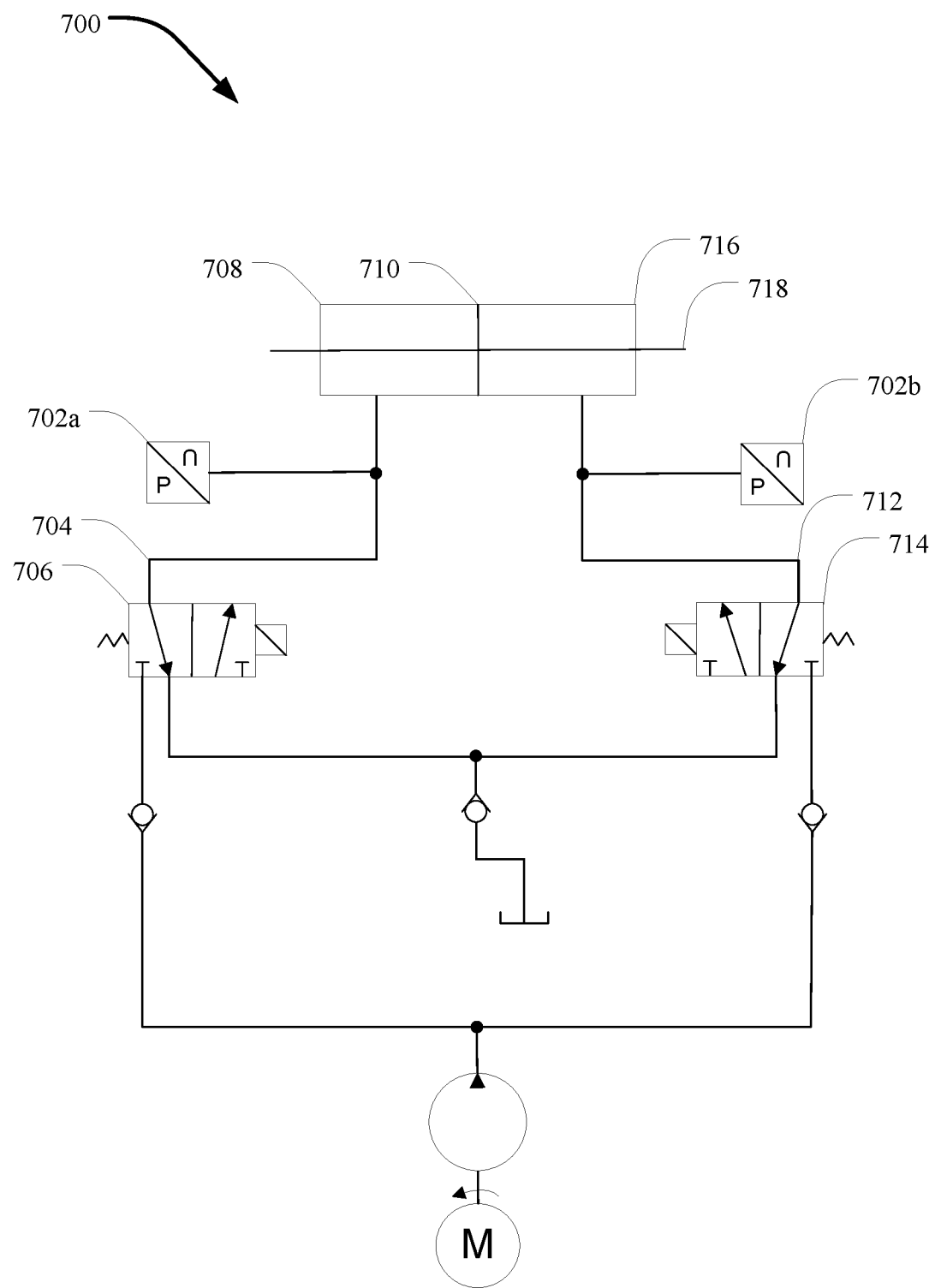
FIGS. 7 and 8 are schematic diagrams of example tilt systems configured as controllable hydraulic systems.

FIG. 7 is an example implementation of a tilt control system 700 for a sidecar wheel or trike with lateral wheels or support wheels or other tilting frame (e.g., any other vehicle having one or more leanable wheels or similar other tiltable configurations), which can generally incorporate or be used with one or more of the features described above with respect to the examples of FIGS. 1-6. The tilt control system 700 may be used for selectively controlling the tilting or orientation of a sidecar wheel or other tilting frame based on a pressure measured in the system 700. Controlling the orientation of the sidecar wheel or tilting frame relative to the main frame can sometimes include preventing or allowing extension and retraction of an actuator, such that the actuator is in a locked state or an unlocked state, respectively. When the actuator is in a locked state, the sidecar wheel or tilting frame can be prevented from tilting whereas when the actuator is in an unlocked state, the actuator can be controllably moved to cause appropriate tilting.

In order to selectively control the tilting or orientation of a sidecar wheel or a tilting frame based on a pressure measured in the system 700, the system 700 includes at least two pressure sensors 702a and 702b (collectively, pressure sensors 702). The pressure sensors 702 might be pressure transducers of various known configurations, or other types of direct or indirect pressure sensors known in the art. As illustrated, the first pressure sensor 702a can measure a first pressure of fluid in a first flow path 704 providing fluid communication between a first control valve 706 and a first end 708 of a hydraulic cylinder 710 of an actuator. Similarly, the second pressure sensor 702b can measure a second pressure of fluid in a second flow path 712 providing fluid communication between a second control valve 714 and a second end 716 of the hydraulic cylinder 710. In other examples, these or other pressure sensors can be otherwise located or connected to similarly measure pressure on opposing (hydraulic) sides of the hydraulic cylinder 710 (or other fluid actuator). Similarly, although particular valves are shown for flow control in FIG. 7, a wide variety of other control valves can be used in some configurations (e.g., float valves, direction valves, or other control valves of various known designs).

A controller device (e.g., a general or special purpose computer, not shown in FIG. 7) may be electrically or otherwise coupled to the pressure sensors 702 to receive signals or other sensor data indicating a fluid pressure of each (or either) of the first flow path 704 and the second flow path 712 and thus determine corresponding first and second pressures, respectively. Based on the determination of the fluid pressure, the controller device can then determine whether to lock tilting the sidecar wheel or tilting frame against tilting (e.g., keep the sidecar wheel or tilting frame locked), or unlock tilting of the sidecar wheel or tilting frame (e.g., keep the sidecar wheel or tilting frame unlocked). In a non-limiting example, if the first or second pressure is within a predetermined threshold, then the sidecar wheel or tilting frame may be unlocked or remain unlocked for tilting (i.e., the hydraulic cylinder 710 of the actuator may be permitted to be controllably moved to cause a particular tilting movement). However, if the first or second pressure is outside the predetermined threshold, then the sidecar wheel or tilting frame may not be allowed to unlock and instead may remain (or be) locked (i.e., the hydraulic cylinder 710 of the actuator may be prevented from moving to prevent any corresponding tilting movement).

In another non-limiting example, the fluid pressure of the first flow path 704 and the second flow path 712 may be compared to each other. If the pressure difference between the first flow path 704 and the second flow path 712 are within a predetermined threshold, then the sidecar wheel or tilting frame may be unlocked or remain unlocked. However, if the pressure difference between the first flow path 704 and the second flow path 712 are outside the predetermined threshold, then the sidecar wheel or tilting frame may not be allowed to unlock and instead may remain (or be) locked. The predetermined threshold may be, for example, an absolute pressure difference (e.g., 1 psi, 5 psi, 10 psi, etc.) or on a percentage difference (e.g., 0%, 1%, 5%, 10%, etc.) between the fluid pressure of the first flow path 704 and the second flow path 712 (i.e., between opposing hydraulic sides of the hydraulic cylinder 710 of the actuator). In some examples, the predetermined threshold may be a range. In a non-limiting example, tilting movement may be permitted if the (absolute value) difference between the first pressure and the second pressure is within a range of 0 psi-10 psi or 0 psi-25 psi (inclusive), or if the (absolute value) percentage difference between the first pressure and the second pressure is within a range of 0%-5% (inclusive) or 0%-10% (inclusive).

Generally, if different pressures are detected at different points of the tilt control system 700, then this may indicate that the actuator piston of the hydraulic cylinder 718 or other fluid actuator is not in equilibrium or balanced. When the actuator piston is not in equilibrium or balanced, the point of contact between the sidecar wheel and a corresponding surface may be unstable and can cause unwanted slipping of the sidecar wheel or undesirable tilting of the sidecar frame or tilting frame. Thus, when the difference or percentage difference between the fluid pressure of the first flow path 704 and the second flow path 712 is large (e.g., 100 psi, 200 psi, 25%, 50%, etc.), then the sidecar wheel or tilting frame may be more likely to be unstable. In contrast, when the difference, percentage difference, etc. between the fluid pressure of the first flow path 704 and the second flow path 712 is small (e.g., 1 psi, 5 psi, 1%, 5%, etc.), then the sidecar wheel or tilting frame may be less likely to be unstable.

Figure 8:
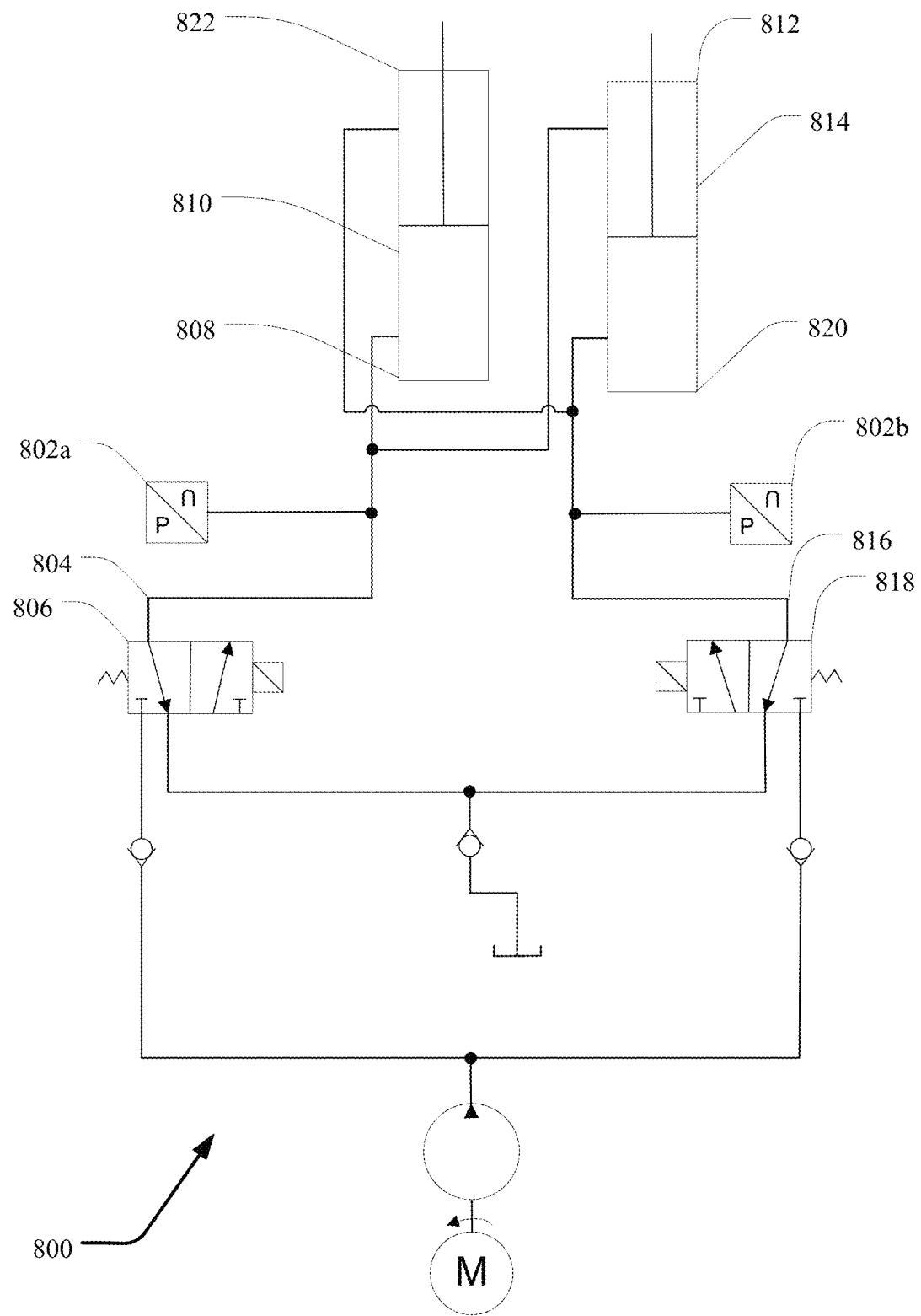

FIG. 8 is an example implementation of a tilt control system 800 for a sidecar or trike with lateral wheels or support wheels or other tilting frame (e.g., any other vehicle having one or more leanable wheels or similar other tiltable configurations), which can generally incorporate or be used with one or more of the features described above with respect to FIGS. 1-7. The tilt control system 800 may be used for selectively controlling the tilting or orientation of lateral wheel(s) or tilting frame of a trike and/or support wheel(s) or tilting frame of a trike (or other tilting arrangement) based on a pressure measured in the system 800.

In order to selectively control the tilting or orientation of a lateral wheel, support wheel, or a tilting frame based on a pressure measured in the system 800, the system 800 includes at least two pressure sensors 802a and 802b (collectively, pressure sensors 802). As similarly noted relative to FIG. 7, the pressure sensors 802 might be pressure transducers of various known configurations, or other types of direct or indirect pressure sensors known in the art. As illustrated, the first pressure sensor 802a can measure a first pressure of fluid in a first flow path 804 providing fluid communication between a first control valve 806 and a first end 808 of a first hydraulic cylinder 810 of a first actuator and a second end 812 of a second hydraulic cylinder 814 of a second actuator. Similarly, the second pressure sensor 802b can measure a second pressure of fluid in a second flow path 816 providing fluid communication between a second control valve 818 and a first end 820 of the second hydraulic cylinder 814 and a second end 822 of the first hydraulic cylinder 810. The first hydraulic cylinder 810, for example, can be attached to a first wheel (e.g., first lateral wheel or first support wheel) and the second hydraulic cylinder 814 can be attached to a second wheel (e.g., second lateral wheel or second support wheel). As similarly noted above relative to FIG. 7, although particular valves and other devices are shown for flow control in FIG. 8, a wide variety of other devices can be used in some configurations (e.g., float valves, direction valves, or other control valves of various known designs).

A controller device (e.g., a general or special purpose computer, not shown in FIG. 8) may be electrically coupled to the pressure sensors 802 to receive signals or other sensor data indicating a fluid pressure of each (or either) of the first flow path 804 and the second flow path 816 and can thus determine corresponding first and second pressures, respectively. Based on the determination of the first pressure and the second pressure, the controller device can then determine whether to lock the lateral wheel(s), support wheel(s), or tilting frame, keep the lateral wheel(s), support wheel(s), or tilting frame locked, keep the lateral wheel(s), support wheel(s), or tilting frame unlocked, or unlock the lateral wheel(s), support wheel(s), or tilting frame. In a non-limiting example, if the first or second pressure is within a predetermined threshold, then the lateral wheel(s), support wheel(s), or tilting frame may be unlocked. However, if the first or second pressure is outside the predetermined threshold, then the lateral wheel(s), support wheel(s), or tilting frame may not be allowed to unlock and instead may remain locked.

In another non-limiting example, the fluid pressure of the first flow path 804 and the second flow path 816 may be compared to each other. If the pressure difference between the first flow path 804 and the second flow path 816 are within a predetermined threshold, then the lateral wheel(s), support wheel(s), or tilting frame may be unlocked. However, if fluid pressure of the first flow path 804 and the second flow path 816 are outside the predetermined threshold, then the lateral wheel(s), support wheel(s), or tilting frame may not be allowed to unlock and instead may remain locked. The predetermined threshold may be, for example, an absolute pressure difference (e.g., 1 psi, 5 psi, 10 psi, etc.), a percentage difference (e.g., 0%, 1%, 5%, 10%, etc.) between the fluid pressure of the first flow path 804 and the second flow path 816 (i.e., between opposing hydraulic sides of the hydraulic cylinders 810, 814). In some examples, the predetermined threshold may be a range. In a non-limiting example, tilting movement may be permitted if the (absolute value) difference between the first pressure and the second pressure is within a range of 0 psi-10 psi or 0 psi-25 psi, or if the (absolute value) percentage difference between the first pressure and the second pressure is within a range of 0%-5% (inclusive), 0%-10% (inclusive).

Generally, if different pressures are detected at different points of the tilt control system 800, then this may indicate that the actuator piston of at least one of the first hydraulic cylinder 810 or the second hydraulic cylinder 814, the lateral wheel(s), support wheel(s), or tilting frame are not in equilibrium or balanced. When the actuator piston of at least one of the first hydraulic cylinder 810 or the second hydraulic cylinder 814, the lateral wheel(s), support wheel(s), or frame is not in equilibrium or balanced, the point of contact between the lateral wheel(s) or support wheel(s) and a corresponding surface may be unstable and can cause unwanted slipping of the lateral wheel(s) or support wheel(s) or undesirable tilting of the lateral wheel(s), support wheel(s), or tilting frame. Thus, when the difference or percentage difference between the fluid pressure of the first flow path 804 and the second flow path 816 is large (e.g., 100 psi, 200 psi, 25%, 50%, etc.), then the lateral wheel(s), support wheel(s), or tilting frame are more likely to be unstable, whereas when the difference or percentage difference, etc. between the fluid pressure of the first flow path 804 and the second flow path 816 is small (e.g., 1 psi, 5 psi, 1%, 5%, etc.), then the lateral wheel(s), support wheel(s), or tilting frame are less likely to be unstable.

The control systems disclosed herein (e.g., as discussed for FIGS. 7 and 8) can in some cases override or otherwise control different manual or automatic operating modes or conditions based on the pressure(s) detected at one or more locations of the tilt control system. In a non-limiting example, if a user of the sidecar, motorcycle, or trike wishes to unlock tilting (e.g., allow free movement of the free end of the actuator via manual operator input (e.g., by pressing a button), the control systems of FIGS. 7 and 8 may override the user control and prevent the tilt system from unlocking when the pressures are within or outside a predetermined threshold (e.g., within or outside a threshold range). Similar control can also be applied relative to different manual or automatic operating modes or conditions as discussed above with respect to FIGS. 4-6. For example, if the motorcycle has reached a speed where tilting may generally be permitted, the controller may still override the effects of this operation parameter to prevent the tilt system from unlocking when the pressures are within or outside a predetermined threshold.

Thus, embodiments of the inventions can provide a tilt control system that prevents, or enables tilting of a tilting frame, relative to a main sidecar frame under certain circumstances including pressures measured at different locations of the tilt system.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A tilt control system for a sidecar and a motorcycle, the tilt control system comprising:
   a main frame;
   a tilting frame;
   an actuator arranged to tilt the tilting frame relative to the main frame, the actuator being configured to retract and extend to control tilting of the tilting frame relative to the main frame;
   at least one of a first pressure sensor or a second pressure sensor; and
   a controller in communication with the actuator and at least one of the first pressure sensor or the second pressure sensor, the controller being configured to:
      determine a first pressure or a second pressure based on sensor data received from at least one of the first pressure sensor or the second pressure sensor;
      compare the first pressure or the second pressure to a threshold criteria; and
      cause the actuator to control an orientation of the tilting frame relative to the main frame, based on the comparison of the first pressure or the second pressure to the threshold criteria.

2. The tilt control system of claim 1, wherein the controller is configured to cause the actuator to control the orientation of the tilting frame by at least one of:
   causing the actuator to lock the orientation of the tilting frame relative to the main frame; or
   causing the actuator to retract or extend, thereby actively changing the orientation of the tilting frame relative to the main frame.

3. The tilt control system of claim 1, wherein the tilt control system comprises the first pressure sensor and the second pressure sensor.

4. The tilt control system of claim 3, wherein the first pressure sensor is located to sense pressure along a first flow path between a first valve and a first end of a hydraulic cylinder of the actuator, and wherein the second pressure sensor is located to sense pressure along a second flow path between a second valve and a second end of the hydraulic cylinder of the actuator.

5. The tilt control system of claim 3, wherein the controller is further configured to determine the first pressure and the second pressure based on sensor data received from the first pressure sensor and the second pressure sensor.

6. The tilt control system of claim 5, wherein the controller is further configured to:
   compare the first pressure to the second pressure; and
   determine a difference between the first pressure and the second pressure,
   wherein comparing the first pressure or the second pressure to the threshold criteria, includes comparing the difference between the first pressure and the second pressure to the threshold criteria, and
   wherein causing the actuator to control the orientation of the tilting frame relative to the main frame, based on the comparison of the first pressure or the second pressure to the threshold criteria, includes causing the actuator to control the orientation of the tilting frame relative to the main frame, based on the comparison of the difference between the first pressure and the second pressure to the threshold criteria.

7. The tilt control system of claim 6, wherein the difference is a percentage difference between the first pressure and the second pressure.

8. The tilt control system of claim 6, wherein, when the comparison of the difference between the first pressure and the second pressure to the threshold criteria is outside of the threshold criteria, the controller causes the actuator to lock the orientation of the tilting frame relative to the main frame.

9. The tilt control system of claim 1, wherein, when an operator input is received to cause the actuator to retract or extend to change the orientation of the tilting frame relative to the main frame, the controller is configured to control the orientation of the tilting frame by overriding the operator input to cause the actuator to lock the orientation of the tilting frame relative to the main frame based on the comparison of the first pressure or the second pressure to the threshold criteria.

10. A tilt control system comprising:
   a main frame;
   a tilting frame;
   a first actuator arranged to tilt the tilting frame relative to the main frame;
   at least one pressure sensor located along a first flow path between a valve and an end of a hydraulic cylinder of the first actuator; and
   a controller in communication with the first actuator, the controller configured to receive sensor data from the at least one pressure sensor, configured to detect the pressure based on the sensor data, and configured to cause the first actuator to control an orientation of the tilting frame relative to the main frame based on a pressure detected in the tilt control system being at least one of outside of or within a predetermined threshold.

11. The tilt control system of claim 10, wherein the controller is configured to cause the first actuator to control the orientation of the tilting frame by at least one of:
- actively extending or retracting the first actuator thereby actively adjusting the orientation of the tilting frame relative to the main frame; or
- preventing extension or retraction of the first actuator thereby locking the orientation of the tilting frame relative to the main frame.

12. A tilt control system comprising:
- a main frame;
- a tilting frame;
- a first actuator arranged to tilt the tilting frame relative to the main frame;
- a motorcycle that includes the main frame;
- at least one lateral wheel coupled to the motorcycle by the tilting frame; and
- a controller in communication with the first actuator configured to cause the first actuator to control an orientation of the tilting frame relative to the main frame based on a pressure detected in the tilt control system being at least one of outside of or within a predetermined threshold.

13. A tilt control system comprising:
- a main frame;
- a tilting frame;
- a first actuator arranged to tilt the tilting frame relative to the main frame;
- a second actuator arranged to tilt the tilting frame relative to the main frame;
- a controller in communication with the first actuator and the second actuator and configured to cause the first actuator and the second actuator to control an orientation of the tilting frame relative to the main frame based on a comparison of a pressure detected in the tilt control system with a predetermined threshold.

14. The tilt control system of claim 13, wherein the controller is further configured to detect a first pressure associated with the first actuator and a second pressure associated with the second actuator, and
wherein causing the first actuator and the second actuator to control the orientation of the tilting frame relative to the main frame based on the comparison of the pressure detected in the tilt control system with the predetermined threshold further comprises causing the first actuator and the second actuator to control the orientation of the tilting frame relative to the main frame based on a comparison of at least one of the first pressure or the second pressure detected in the tilt control system with the predetermined threshold.

15. The tilt control system of claim 14, wherein causing the first actuator and the second actuator to control the orientation of the tilting frame relative to the main frame based on the comparison of the pressure detected in the tilt control system with the predetermined threshold further comprises causing the first actuator and the second actuator to control the orientation of the tilting frame relative to the main frame based on at least one of the first pressure or the second pressure being at least one of outside of or within the predetermined threshold.

16. The tilt control system of claim 15, wherein causing the first actuator and the second actuator to control the orientation of the tilting frame relative to the main frame based on at least one of the first pressure and the second pressure detected in the tilt control system being at least one of outside of or within the predetermined threshold further comprises:
- determining a difference between the first pressure and the second pressure;
- comparing the difference between the first pressure and the second pressure to the predetermined threshold; and
- causing the first actuator and the second actuator to control the orientation of the tilting frame relative to the main frame based on the comparison of the difference between the first pressure and the second pressure with the predetermined threshold.

17. A computer-implemented method of controlling tilting for a motorcycle system, using an actuator coupled to a main frame of the motorcycle system and to a tilting frame of the motorcycle system, the method comprising:
- receiving, at an electronic control device, sensor data from at least one of a first pressure sensor or a second pressure sensor;
- determining, using the electronic control device, a hydraulic pressure of the actuator from the sensor data; and
- causing, using the electronic control device, the actuator to control an orientation of the tilting frame relative to the main frame based on a determined hydraulic pressure of the actuator.

18. The method of claim 17, wherein controlling the actuator includes at least one of:
- causing the actuator to lock the orientation of the tilting frame relative to the main frame; or
- causing the actuator to retract or extend to actively change the orientation of the tilting frame relative to the main frame.

19. The method of claim 17, the method further comprising:
- comparing, using the electronic control device, the determined hydraulic pressure of the actuator to a predetermined threshold; and
- wherein causing the actuator to control the orientation of the tilting frame relative to the main frame based on the determined hydraulic pressure of the actuator, further comprises, based on a comparison of the determined hydraulic pressure of the actuator to the predetermined threshold, causing, using the electronic control device, the actuator to control the orientation of the tilting frame relative to the main frame.

* * * * *

UNITED STATES PATENT AND TRADEMARK OFFICE
CERTIFICATE OF CORRECTION

PATENT NO. : 12,296,917 B2
APPLICATION NO. : 18/433907
DATED : May 13, 2025
INVENTOR(S) : Jason Breazlan Page 1 of 1

It is certified that error appears in the above-identified patent and that said Letters Patent is hereby corrected as shown below:

In the Specification

Column 15, Line 15, "FC" should be --$I^2C$--.

Column 23, Line 53, "100" should be --10°--.

In the Claims

Claim 31, Column 31, Line 30, "frame;" should be --frame; and--.

Signed and Sealed this
Twenty-second Day of July, 2025

Coke Morgan Stewart
*Acting Director of the United States Patent and Trademark Office*